United States Patent
Takahashi et al.

(10) Patent No.: US 11,407,396 B2
(45) Date of Patent: Aug. 9, 2022

(54) ELECTRIC BOOSTER

(71) Applicant: HITACHI AUTOMOTIVE SYSTEMS, LTD., Ibaraki (JP)

(72) Inventors: Naoki Takahashi, Zama (JP); Daisuke Goto, Atsugi (JP); Takaya Tsukagoshi, Hitachinaka (JP); Norikazu Matsuzaki, Atsugi (JP); Hiroaki Sato, Hitachi (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 222 days.

(21) Appl. No.: 16/647,599

(22) PCT Filed: Sep. 18, 2018

(86) PCT No.: PCT/JP2018/034325
§ 371 (c)(1),
(2) Date: Mar. 16, 2020

(87) PCT Pub. No.: WO2019/065332
PCT Pub. Date: Apr. 4, 2019

(65) Prior Publication Data
US 2020/0262409 A1 Aug. 20, 2020

(30) Foreign Application Priority Data
Sep. 26, 2017 (JP) .............................. JP2017-185039

(51) Int. Cl.
*B60T 13/74* (2006.01)
*B60T 8/32* (2006.01)
(Continued)

(52) U.S. Cl.
CPC .......... *B60T 13/745* (2013.01); *B60T 8/3265* (2013.01); *B60T 13/662* (2013.01); *B60T 7/042* (2013.01)

(58) Field of Classification Search
CPC ...... B60T 7/042; B60T 8/3265; B60T 13/662; B60T 13/745
See application file for complete search history.

(56) References Cited

U.S. PATENT DOCUMENTS 9,308,897 B2 * 4/2016 Watanabe ........... B60L 15/2009
9,452,747 B2 * 9/2016 Fujiki ................... B60T 13/662
(Continued)

FOREIGN PATENT DOCUMENTS

| JP | 2011-235894 | 11/2011 |
|----|-------------|---------|
| JP | 2013-10372 | 1/2013 |
| JP | 2013010372 A | * 1/2013 |

OTHER PUBLICATIONS

International Search Report dated Nov. 13, 2018 in International (PCT) Application No. PCT/JP2018/034325 with English translation.
(Continued)

*Primary Examiner* — Thomas E Lazo
(74) *Attorney, Agent, or Firm* — Wenderoth, Lind & Ponack, L.L.P.

(57) ABSTRACT

An electric booster including an input member that is advanceably/retractably moved according to a brake pedal operation. An electric motor of an electric actuator advanceably/retractably moves a power piston. A master pressure control unit sets a target movement amount of the power piston according to an amount of a movement of the input member that is caused by the brake pedal, and controls the electric motor to move the power piston so as to achieve the target movement amount, thereby causing a brake hydraulic pressure to be generated in a master cylinder. The master pressure control unit includes a reaction force generation portion, which changes a characteristic of a hydraulic reaction force applied to the brake pedal. The reaction force generation portion corrects the target movement amount of
(Continued)

the power piston according to a temporal change in the movement amount of the input member.

3 Claims, 14 Drawing Sheets

(51) Int. Cl.
    *B60T 13/66*         (2006.01)
    *B60T 7/04*          (2006.01)

(56)            References Cited

U.S. PATENT DOCUMENTS

2009/0115242 A1    5/2009   Ohtani et al.
2013/0025273 A1*   1/2013   Nozawa .................. B60T 7/042
                                                       60/545
2014/0095044 A1*   4/2014   Kikawa ................... B60T 7/042
                                                        701/70

OTHER PUBLICATIONS

Written Opinion of the International Searching Authority dated Nov. 13, 2018 in International (PCT) Application No. PCT/JP2018/034325 with English translation.

* cited by examiner

ELECTRIC BOOSTER

TECHNICAL FIELD

The present invention relates to an electric booster that applies a braking force to a vehicle such as an automobile.

BACKGROUND ART

One known booster (a brake booster) mounted on a vehicle such as an automobile is an electric booster configured to use an electric actuator. Now, PTL 1 discusses an electric booster configured to be able to acquire various brake characteristics by variably controlling a relative position between an "input member advanceable and retractable according to an operation on a brake pedal" and an "assist member advanceable and retractable by the electric actuator". According to this technique, the input member is configured to receive a "part of a reaction force derived from a brake hydraulic pressure" and a "spring reaction force of a return spring mounted between the input member and the assist member".

CITATION LIST

Patent Literature

[PTL 1] Japanese Patent Application Public Disclosure No. 2011-235894

SUMMARY OF INVENTION

Technical Problem

According to the technique like the invention discussed in PTL 1, the electric booster is configured in such a manner that the reaction force applied to the brake pedal (hereinafter also referred to as a pedal reaction force) changes according to a positional relationship between the input member and the assist member. In this case, the pedal reaction force changes depending on a response time of the assist member, and this makes it difficult to arbitrarily change the pedal reaction force according to, for example, a speed at which the brake pedal is pressed (a speed at which the input member is moved).

Solution to Problem

An object of the present invention is to provide an electric booster capable of changing a pedal feeling.

According to one aspect of the present invention, an electric booster includes an input member advanceable and retractable according to an operation on a brake pedal, an assist member disposed movably relative to this input member, an electric actuator configured to advanceably/retractably move this assist member, and a control portion configured to set a target movement amount of the assist member according to an amount of a movement of the input member that is caused by the brake pedal, and control the electric actuator to move the assist member so as to achieve the target movement amount, thereby causing a brake hydraulic pressure to be generated in a master cylinder. The control portion includes a reaction force generation portion configured to change a characteristic of a hydraulic reaction force applied to the brake pedal. The reaction force generation portion corrects the target movement amount according to a temporal change in the movement amount of the input member.

The electric booster according to the one aspect of the present invention can change the pedal feeling.

BRIEF DESCRIPTION OF DRAWINGS

FIG. 4 is a half cross-sectional view schematically illustrating a power piston, an input member, a reaction disk, an output rod, a master cylinder, and the like.

DESCRIPTION OF EMBODIMENTS

In the following description, an electric booster according to each of embodiments of the present invention will be described in detail with reference to the accompanying drawings based on an example in which this electric booster is mounted on a four-wheeled automobile. Individual steps in a flowchart illustrated in FIG. 7 will be each represented by the symbol "S" (for example, "step 1"="S1").

Figure 1:
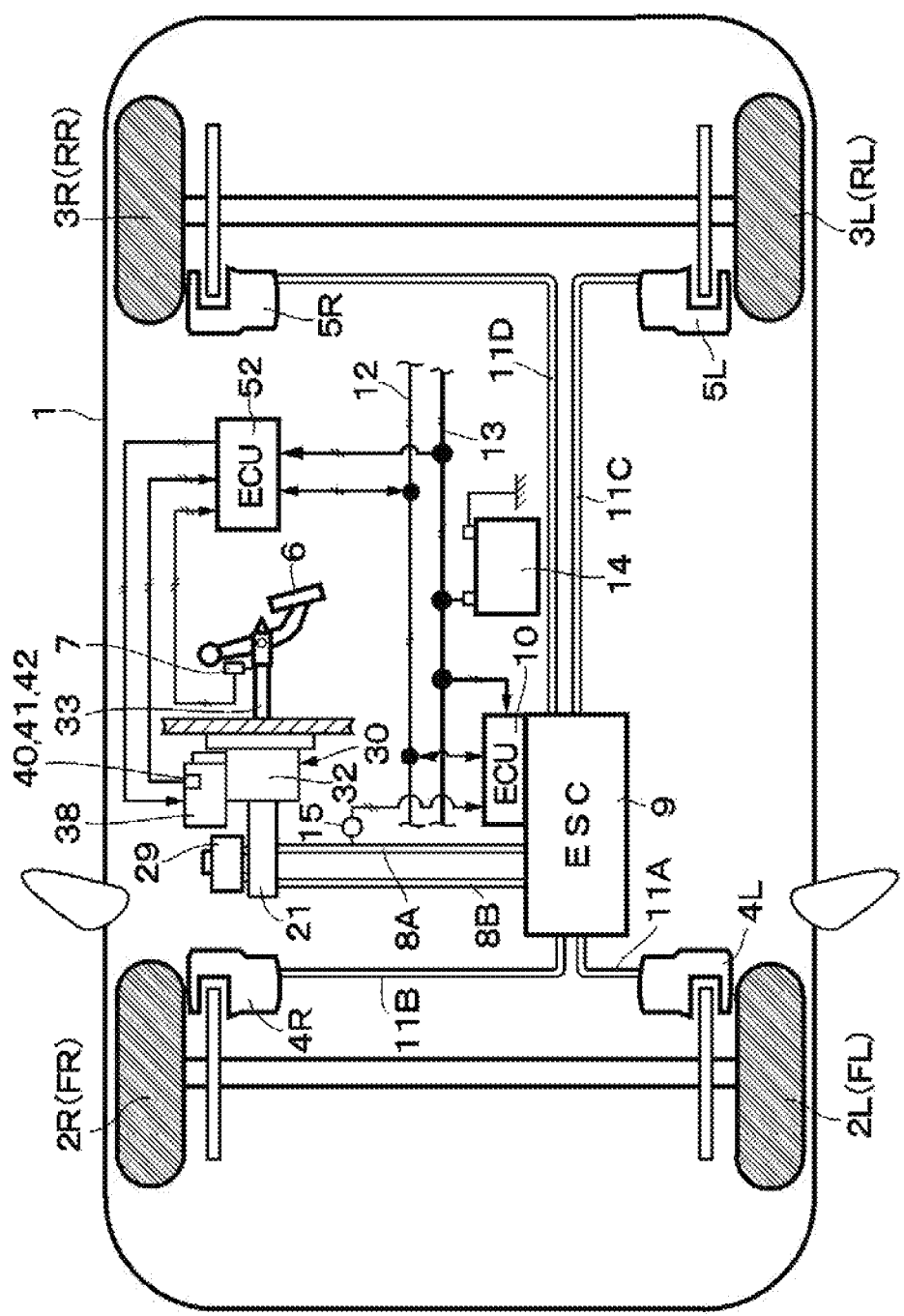
FIG. 1 schematically illustrates a vehicle on which an electric booster according to an embodiment is mounted.

FIGS. 1 to 11 illustrate a first embodiment. In FIG. 1, four wheels in total that include front left and right wheels 2L and 2R and rear left and right wheels 3L and 3R are mounted on a vehicle body 1 forming a main structure of a vehicle under (on a road surface side of) this vehicle body 1. These wheels (i.e., the front wheels 2L and 2R and the rear wheels 3L and 3R) form the vehicle together with the vehicle body 1. A brake system for applying a braking force is mounted on the vehicle. In the following description, the brake system of the vehicle will be described.

Front wheel-side wheel cylinders 4L and 4R are mounted on the front left and right wheels 2L and 2R, respectively. Rear wheel-side wheel cylinders 5L and 5R are mounted on the rear left and right wheels 3L and 3R, respectively. Each of these wheel cylinders 4L, 4R, 5L, and 5R serves as a wheel brake mechanism (a frictional brake mechanism) that applies a braking force (a frictional braking force) to the respective wheels 2L, 2R, 3L, and 3R, and is constructed with use of, for example, a hydraulic disk brake or a drum brake.

A brake pedal 6 is provided on a dashboard side of the vehicle body 1. This brake pedal 6 is operated by being pressed by a driver when the braking force is applied to the vehicle. The brake pedal 6 is connected to an input member 33 (an input rod 34) of an electric booster 30, which will be described below. The operation of pressing the brake pedal 6 is transmitted to a master cylinder 21 serving as an oil hydraulic source (a liquid hydraulic source) via the electric booster 30, thereby generating a brake hydraulic pressure in the master cylinder 21 via the electric booster 30. As a result, each of the wheel cylinders 4L, 4R, 5L and 5R can apply a braking force based on the brake hydraulic pressure to each of the wheels 2L, 2R, 3L, and 3R.

A brake operation sensor 7 as an operation amount detection device (an input member movement amount detection device) is provided to the brake pedal 6 (more specifically, the input member 33 of the electric booster 30). The brake operation sensor 7 detects an amount of the operation performed on the brake pedal 6 by the driver (more specifically, a movement amount of the input member 33). The brake operation sensor 7 can be embodied by, for example, a displacement sensor (a stroke sensor) that detects a stroke amount (a pedal stroke) corresponding to a displacement amount (the movement amount) of the brake pedal 6 (the input member 33). The brake operation sensor 7 is not limited to the displacement sensor, and can be embodied by various kinds of sensors capable of detecting the operation amount (the pressed amount, the movement amount, or the displacement amount) of the brake pedal 6 (the input member 33), such as a force sensor that detects a pedal pressing force (a load sensor), and an angle sensor that detects a rotational angle (a tilt) of the brake pedal 6. In this case, the brake operation sensor 7 may be constructed with use of one (one kind of) sensor or may be constructed with use of a plurality of (a plurality of kinds of) sensors.

The brake operation sensor 7 (hereinafter referred to as the displacement sensor 7) is connected to a master pressure control unit 52 serving as an electric booster ECU (Electronic Control Unit), which will be described below. In other words, a detection signal of the displacement sensor 7 (a brake pedal operation amount) is output to the master pressure control unit 52. As will be described below, the master pressure control unit 52 outputs a driving signal (a driving electric current) to an electric motor 38 of the electric booster 30 based on a value detected by the displacement sensor 7 (the operation amount), and generates the hydraulic pressure (the brake hydraulic pressure) in the master cylinder 21 combined with the electric booster 30. Further, the master pressure control unit 52 can also generate the hydraulic pressure in the master cylinder 21, for example, when receiving an autonomous brake instruction via a vehicle data bus 12, which will be described below. At this time, the master pressure control unit 52 can output the driving signal (the driving electric current) to the electric motor 38 of the electric booster 30 based on the autonomous brake instruction to generate the hydraulic pressure in the master cylinder 21 independently of the operation performed on the brake pedal 6 by the driver.

The hydraulic pressure generated in the master cylinder 21 is supplied to each of the wheel cylinders 4L, 4R, 5L, and 5R via a hydraulic pressure supply device 9, and the braking force is applied to each of the wheels 2L, 2R, 3L, and 3R. More specifically, as illustrated in FIG. 1, the hydraulic pressure generated in the master cylinder 21 is supplied to the hydraulic pressure supply device 9 (hereinafter referred to as the ESC 9) via a pair of cylinder-side hydraulic pipes 8A and 8B. The ESC 9 is provided between the master cylinder 21 and the wheel cylinders 4L, 4R, 5L, and 5R. The ESC 9 distributes and supplies the hydraulic pressure output from the master cylinder 21 via the cylinder-side hydraulic pipes 8A and 8B to the wheel cylinders 4L, 4R, 5L, and 5R via brake-side pipe portions 11A, 11B, 11C, and 11D, respectively.

Figure 2:
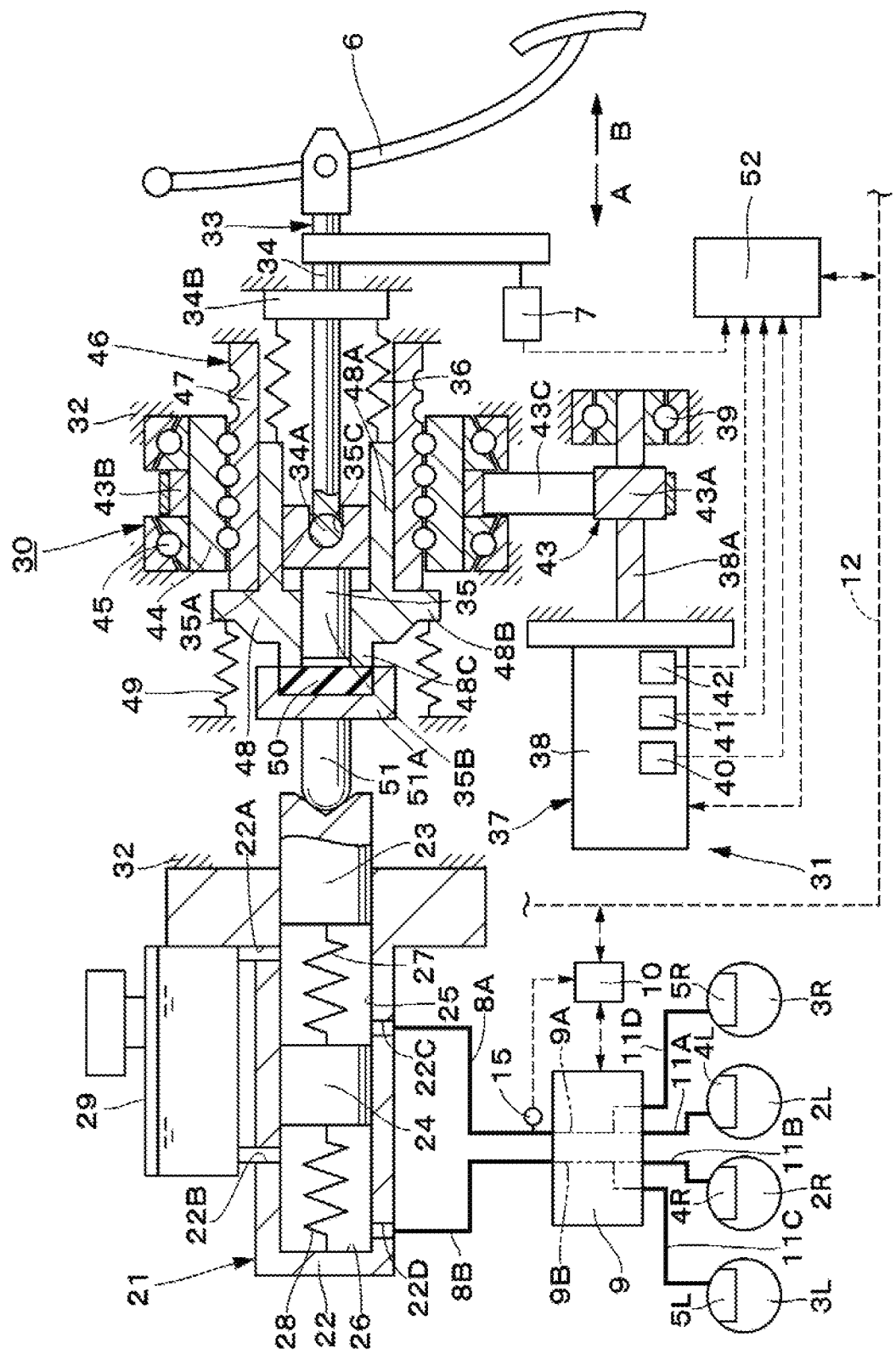
FIG. 2 illustrates a configuration of a brake system of the vehicle including the electric booster.

As illustrated in FIG. 2, the ESC 9 serving as a wheel pressure control mechanism includes two hydraulic circuit systems consisting of a first hydraulic circuit 9A and a second hydraulic circuit 9B. The first hydraulic circuit 9A functions to supply a hydraulic pressure output from a primary port (a first supply port 22C) of the master cylinder 21 to the wheel cylinder 4L of the front left wheel 2L and the wheel cylinder 5R of the rear right wheel 3R. The second hydraulic circuit 9B functions to supply a hydraulic pressure output from a secondary port (a second supply port 22D) of the master cylinder 21 to the wheel cylinder 4R of the front right wheel 2R and the wheel cylinder 5L of the rear left wheel 3L.

Now, the ESC 9 includes, for example, a plurality of control valves, a hydraulic pump, an electric motor, and a hydraulic control reservoir (none of them illustrated). The hydraulic pump increases the pressure of the brake fluid. The electric motor drives this hydraulic pump. The hydraulic control reservoir temporarily stores extra brake fluid. Opening/closing of each of the control valves and driving of the electric motor of the ESC 9 are controlled by a wheel pressure control unit 10 serving as a hydraulic pressure supply device ECU. The wheel pressure control unit 10 includes, for example, a microcomputer, a driving circuit, and a power source circuit. The microcomputer includes, for example, a memory including a flash memory, a ROM, a RAM, an EEPROM, and/or the like (none of them illustrated), in addition to an arithmetic device (a CPU). The wheel pressure control unit 10 is a hydraulic pressure supply device control unit that electrically controls driving of the ESC 9 (each of the control valves and the electric motor thereof).

An input side of the wheel pressure control unit 10 is connected to the vehicle data bus 12 and a hydraulic sensor 15. An output side of the wheel pressure control unit 10 is connected to each of the control valves of the ESC 9, the electric motor, and the vehicle data bus 12. The wheel pressure control unit 10 individually drives and controls each of the control valves of the ESC 9, the electric motor, and the like. By this driving and control, the wheel pressure control unit 10 can perform control of reducing, maintaining, and increasing or pressurizing the brake hydraulic pressure to supply to the wheel cylinders 4L, 4R, 5L, and 5R via the brake-side pipe portions 11A, 11B, 11C, and 11D, respectively, for each of the wheel cylinders 4L, 4R, 5L, and 5R individually. In this case, the wheel pressure control unit 10 can realize, for example, braking force distribution control, anti-lock brake control, vehicle stabilization control, hill start aid control, traction control, adaptive cruise control, traffic lane departure avoidance control, and obstacle avoidance control (brake control for reducing collision damage) by actuating and controlling the ESC 9.

As illustrated in FIGS. 1 and 2, the wheel pressure control unit 10 and the master pressure control unit 52, which will be described below, are connected to each other via the vehicle data bus 12. The vehicle data bus 12 is a communication network between vehicle ECUs (communication network between devices) called a V-CAN that is mounted on the vehicle. More specifically, the vehicle data bus 12 is a serial communication portion that establishes multiplex communication among a large number of electronic devices mounted on the vehicle (for example, between the wheel pressure control unit 10 and the master pressure control unit 52). Electric power is supplied from an in-vehicle battery 14 to the wheel pressure control unit 10 via an electric power line 13. Electric power is also supplied from the in-vehicle battery 14 to the master pressure control unit 52, which will be described below, via the electric power line 13. A line with two slash marks added thereto in FIG. 1 indicates an electricity-related line such as a signal line and an electric power source line.

The hydraulic sensor 15 is provided in, for example, the cylinder-side hydraulic pipe 8A between the master cylinder 21 (the first hydraulic chamber 25 thereof) and the ESC 9. The hydraulic sensor 15 is a hydraulic detection device that detects the pressure (the brake hydraulic pressure) generated in the master cylinder 21, i.e., a hydraulic pressure in the cylinder-side hydraulic pipe 8A. As illustrated in FIGS. 1 and 2, the hydraulic sensor 15 is electrically connected to, for example, the wheel pressure control unit 10 of the ESC 9. A detection signal of the hydraulic sensor 15 (a hydraulic value) is output to the wheel pressure control unit 10.

Figure 3:
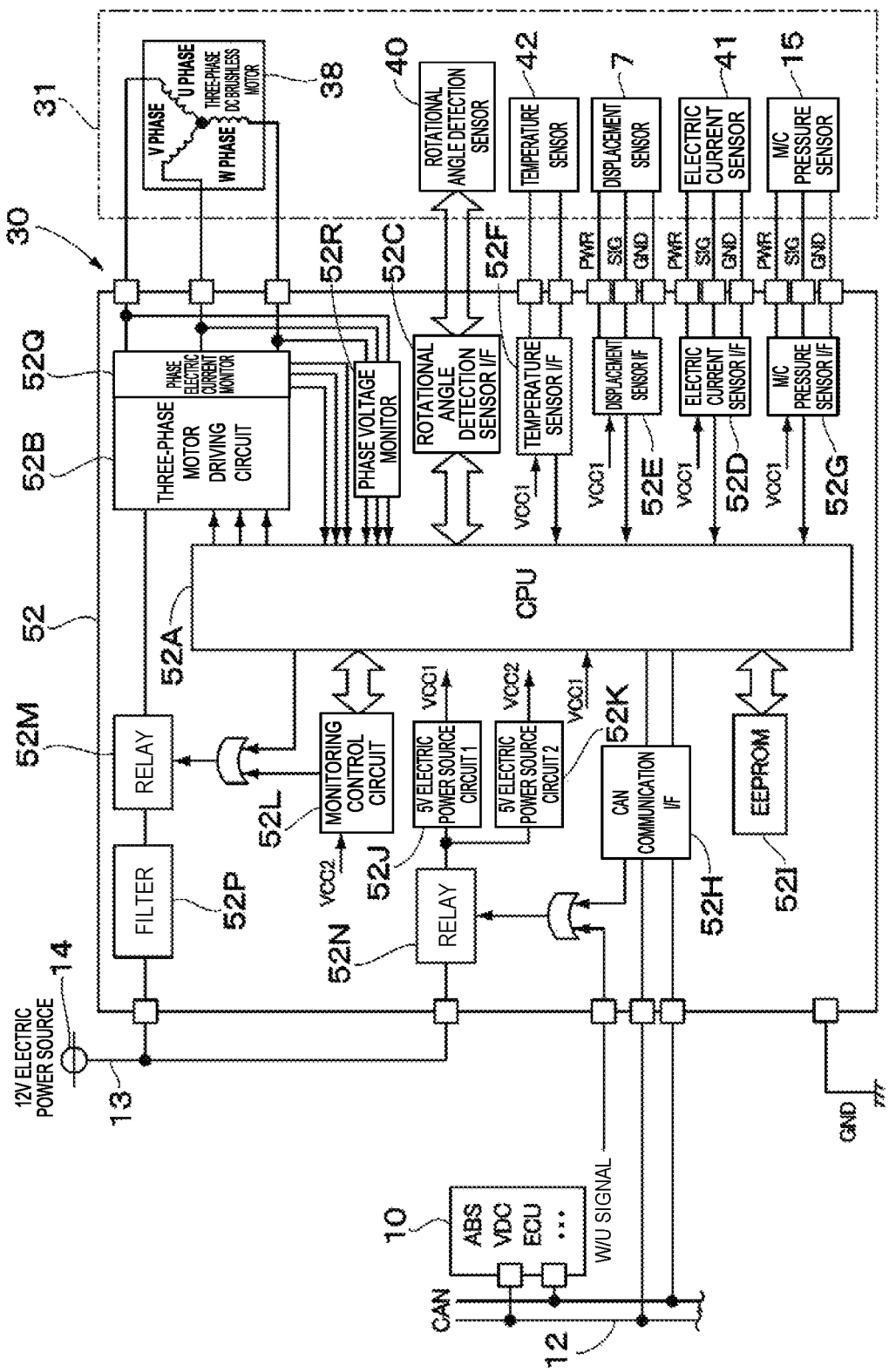
FIG. 3 is a circuit block diagram illustrating a circuit configuration of a master pressure control unit and a master pressure control mechanism.

The wheel pressure control unit 10 outputs the hydraulic value detected by the hydraulic sensor 15 to the vehicle data bus 12. The master pressure control unit 52, which will be described below, can monitor (acquire) the hydraulic value generated in the master cylinder 21 by receiving the hydraulic value from the wheel pressure control unit 10. The hydraulic sensor (an M/C pressure sensor) 15 may be configured to be directly connected to the master pressure control unit 52 as illustrated in FIG. 3. Further, the hydraulic sensor 15 may be provided not only in the cylinder-side hydraulic pipe 8A corresponding to the primary chamber (the first hydraulic chamber 25) side of the master cylinder 21 but also in the cylinder-side hydraulic pipe 8B corresponding to the secondary chamber (the second hydraulic chamber 26) side of the master cylinder 21. Further, the hydraulic sensor 15 may be configured to be provided in the ESC 9 or the master cylinder 21.

Next, the master cylinder 21, which generates a master pressure (an M/C pressure), will be described.

The master cylinder 21 is actuated by the brake operation performed by the driver. The master cylinder 21 is a cylinder device that supplies the brake hydraulic pressure to the wheel cylinders 4L, 4R, 5L, and 5R, which apply the braking force to the vehicle. As illustrated in FIG. 2, the master cylinder 21 includes a tandem-type master cylinder. The master cylinder 21 includes a cylinder main body 22, a primary piston 23, a secondary piston 24, the first hydraulic chamber 25, the second hydraulic chamber 26, a first return spring 27, and a second return spring 28.

The cylinder main body 22 is formed into a closed bottomed cylindrical shape having an opening end on one side thereof (for example, a right side in a horizontal direction in FIG. 2 and a rear side in a longitudinal direction of the vehicle) and a bottom portion on the other side thereof (for example, a left side in the horizontal direction in FIG. 2 and a front side in the longitudinal direction of the vehicle) in an axial direction (the horizontal direction in FIG. 2). The opening end side of the cylinder main body 22 is attached to a booster housing 32 of the electric booster 30, which will be described below. First and second reservoir ports 22A and 22B connected to a reservoir 29 are provided on the cylinder main body 22. Further, the first and second supply ports 22C and 22D are provided on the cylinder main body 22. The cylinder-side hydraulic pipes 8A and 8B are connected to the first and second supply ports 22C and 22D, respectively. The first and second supply ports 22C and 22D are connected to the wheel cylinders 4L, 4R, 5L, and 5R via the cylinder-side hydraulic pipes 8A and 8B, and the like.

The primary piston 23 is slidably provided in the cylinder main body 22, and closes the opening end in the cylinder main body 22. One axial side of the primary piston 23 (the right side in FIG. 1) protrudes outward from the opening end side of the cylinder main body 22, and this protruding end side is in abutment with an output rod 51, which will be described below. The secondary piston 24 is located on the bottom portion side of the cylinder main body 22 with respect to the primary piston 23, and is provided slidably in the cylinder main body 22. The first hydraulic chamber 25 is defined between the primary piston 23 and the secondary piston 24. The second hydraulic chamber 26 is defined between the secondary piston 24 and the bottom portion of the cylinder main body 22. The first and second hydraulic chambers 25 and 26 are formed so as to be axially spaced apart from each other in the cylinder main body 22.

The first return spring 27 is positioned in the first hydraulic chamber 25, and is arranged between the primary piston 23 and the secondary piston 24. The first return spring 27 biases the primary piston 23 toward the opening end side of the cylinder main body 22. The second return spring 28 is positioned in the second hydraulic chamber 26, and is arranged between the bottom portion of the cylinder main body 22 and the secondary piston 24. The second return spring 28 biases the secondary piston 24 toward the first hydraulic chamber 25 side. The primary piston 23 and the secondary piston 24 are biased to initial positions by the first return spring 27 and the second return spring 28, respectively.

Now, for example, when the brake pedal 6 is operated by being pressed, the primary piston 23 and the secondary piston 24 are displaced toward the bottom portion side of the cylinder main body 22 in the cylinder main body 22 of the master cylinder 21. At this time, when the first and second reservoir pots 22A and 22B are blocked by the primary piston 23 and the secondary piston 24, respectively, the brake hydraulic pressure (the M/C pressure) is generated from the master cylinder 21 due to the brake fluid in the first and second hydraulic chambers 25 and 26. On the other hand, when the operation on the brake pedal 6 is released, the primary piston 23 and the secondary piston 24 are displaced toward the opening portion side of the cylinder main body 22 by the first and second return springs 27 and 28.

The reservoir 29 is attached to the cylinder main body 22 of the master cylinder 21. The reservoir 29 is configured as a hydraulic oil tank that sores the brake fluid therein, and replenishes (supplies and discharges) the brake fluid into the hydraulic chambers 25 and 26 in the cylinder main body 22. As illustrated in FIG. 2, when the primary piston 23 and the secondary piston 24 are located at their respective initial positions, i.e., the first reservoir port 22A is in communication with the first hydraulic chamber 25 and the second reservoir port 22B is in communication with the second hydraulic chamber 26, the brake fluid can be supplied or discharged between the reservoir 29 and the hydraulic chambers 25 and 26.

On the other hand, when the first reservoir port 22A is disconnected from the first hydraulic chamber 25 by the primary piston 23 and the second reservoir port 22B is disconnected from the second hydraulic chamber 26 by the secondary piston 24, the supply and the discharge of the brake fluid are stopped between the reservoir 29 and the hydraulic chambers 25 and 26. In this case, the brake hydraulic pressure (M/C pressure) is generated in the hydraulic chambers 25 and 26 of the master cylinder 21 according to the displacements of the primary piston 23 and the secondary piston 24. This brake hydraulic pressure is supplied from the first and second supply ports 22C and 22D to the ESC 9 via the pair of cylinder-side hydraulic pipes 8A and 8B.

Next, the electric booster 30, which controls the master pressure (the M/C pressure), will be described The electric booster 30 is provided between the brake pedal 6 and the master cylinder 21. The electric booster 30 serves as a boosting mechanism (a booster) that transmits the brake operation force (the pressing force) to the master cylinder 21 while powering up this force by driving the electric motor 38 according to the brake pedal operation amount (the pressing amount) when the operation of pressing the brake pedal 6 is performed by the driver.

The electric booster 30 includes a master pressure control mechanism 31 integrally built in the master cylinder 21, and the master pressure control unit 52 as a control portion (a control device) that controls the actuation of the master pressure control mechanism 31. In this case, the master pressure control mechanism 31 includes, for example, the electric actuator 37 and a power piston 48 as an assist member (an aid member). More specifically, the electric booster 30 includes the booster housing 32 as a housing, the input member 33, the electric actuator 37, the power piston 48, a reaction disk 50 as a reaction force distribution member, the output rod 51, the master pressure control unit 52, and the like. Further, the electric booster 30 includes the displacement sensor 7, a rotational angle detection sensor 40, an electric current sensor 41, a temperature sensor 42, and the hydraulic sensor 15 as sensors that detect various kinds of state amounts (a state detection device).

The booster housing 32 forms an outer shell of the electric booster 30, and is fixed to, for example, a front wall of a vehicle compartment, which is the dashboard of the vehicle body 1. The booster housing 32 contains therein the electric motor 38, a speed reduction mechanism 43, a rotation-linear motion conversion mechanism 46, the power piston 48, the reaction disk 50, the output rod 51, and the like.

The input member 33 is provided axially movably relative to the booster housing 32, and is connected to the brake pedal 6. In other words, the input member 33 is advanceably/retractably moved by the operation on the brake pedal 6. In this case, a reaction force applied from the primary piston 23 in the master cylinder 21 is partially transmitted to the input member 33. The input member 33 includes an input rod 34 and an input piston 35. The input rod 34 and the input piston 35 are inserted through inside the rotation-linear motion conversion mechanism 46 and the power piston 48 in a concentrically coupled state. One axial side of the input rod 34 protrudes from the booster housing 32. Then, the brake pedal 6 is coupled with the one axial side of the input rod 34 that corresponds to the protruding end.

On the other hand, the other axial side of the input rod 34 includes a spherical portion 34A formed on a distal end thereof, and is inserted in the power piston 48. An annular flange portion 34B is provided at an intermediate portion of the input rod 34. The flange portion 34B protrudes radially outward along an entire circumference. A first return spring 36 is provided between this flange portion 34B and the power piston 48. The first return spring 36 constantly biases the input member 33 (the input rod 34) relative to the power piston 48 toward the one axial side.

The input piston 35 is fittedly inserted in the power piston 48 axially movably (slidably) relative to the power piston 48. The input piston 35 includes a piston main body 35A and a pressure reception portion 35B. The piston main body 35A is provided so as to face the input rod 34. The pressure reception portion 35B is provided so as to protrude from this piston main body 35A toward the other axial side. A recessed portion 35C is provided on one axial side of the piston main body 35A at a position corresponding to the spherical portion 34A of the input rod 34. The spherical portion 34A of the input rod 34 is fixed in the recessed portion 35C with use of a method such as swaging.

On the other hand, a distal end surface of the pressure reception portion 35B serves as an abutment surface in abutment with the reaction disk 50. For example, when the vehicle is not braked without the brake pedal 6 operated, a predetermined space is formed between the distal end surface of the pressure reception portion 35B and the reaction disk 50. When the brake pedal 6 is operated by being pressed, the distal end surface of the pressure reception portion 35B and the reaction disk 50 are brought into abutment with each other, and a thrust force of the input member 33 (the pressing force) is applied to the reaction disk 50.

The electric actuator 37 is actuated when the master cylinder 21 generates the hydraulic pressure therefrom, and applies the brake hydraulic pressure to each of the wheel cylinders 4L, 4R, 5L, and 5R of the vehicle. In this case, the electric actuator 37 advanceably/retractably moves the power piston 48 as the assist member according to the movement of the input member 33. In other words, the electric actuator 37 moves the power piston 48 in the axial direction of the master cylinder 21 and applies the thrust force to this power piston 48. As a result, the power piston 48 causes the primary piston 23 (and the secondary piston 24) to be axially displaced in the cylinder main body 22 of the master cylinder 21.

The electric actuator 37 includes the electric motor 38, which advanceably/retractably moves the power piston 48. In the embodiment, the electric actuator 37 includes the electric motor 38, the speed reduction mechanism 43, a cylindrical rotational member 44, and the rotation-linear motion conversion mechanism 46. The speed reduction mechanism 43 slows down the rotation of this electric motor 38. The rotation slowed down by this speed reduction mechanism 43 is transmitted to the cylindrical rotational member 44. The rotation-linear motion conversion mechanism 46 converts the rotation of this cylindrical rotational member 44 into the axial displacement of the power piston 48. The electric motor 38 is constructed with use of, for example, a DC brushless motor, and includes a rotational shaft 38A, a rotor (not illustrated), and a stator (not illustrated). The rotational shaft 38A functions as a motor shaft (an output shaft). The rotor is, for example, a permanent magnet attached to this rotational shaft 38A. The stator is, for example, a coil (an armature) attached to the booster housing 32. An end portion of the rotational shaft 38A on the one axial side is rotatably supported by the booster housing 32 via a roller bearing 39.

The rotational angle detection sensor 40, such as a resolver, a rotational angle sensor, and an angular sensor, is provided to the electric motor 38. The rotational angle detection sensor 40 detects a rotational angle (a rotational position) of the electric motor 38 (the rotational shaft 38A thereof), and outputs a detection signal thereof to the master pressure control unit 52. The master pressure control unit 52 performs feedback control on the rotational position of the electric motor 38 (i.e., the displacement of the power piston 48) according to this rotational angle signal. Then, the rotational angle of the electric motor 38 that is detected by the rotational angle detection sensor 40 allows a movement amount (a displacement amount or a position) of the power piston 48 to be calculated by using a speed reduction ratio of the speed reduction mechanism 43, which will be described below, and a linear displacement amount of the rotation-linear motion conversion mechanism 46 per unit rotational angle.

Therefore, the rotational angle detection sensor 40 forms an assist member movement amount detection device that detects the movement amount of the power piston 48 (a power piston position). The rotational angle detection sensor 40 is not limited to the resolver, and may be constructed with use of, for example, a rotary potentiometer or an encoder. Further, the rotational angle detection sensor 40 may detect the rotational angle after the speed is slowed down by the speed reduction mechanism 43 (for example, a rotational angle of the cylindrical rotational member 44) instead of the rotational angle (the rotational position) of the electric motor 38. Further, for example, a displacement sensor (a position sensor) that directly detects the linear displacement (the axial displacement) of the power piston 48 may be used instead of the rotational angle detection sensor 40 that indirectly detects the movement amount of the power piston 48. Alternatively, a linear displacement of a linear motion member 47 of the rotation-linear motion conversion mechanism 46 may be detected with use of a displacement sensor.

Further, the electric current sensor 41 and the temperature sensor 42 are provided to the electric motor 38. The electric current sensor 41 detects an electric current value supplied to the electric motor 38 (an electric power supply amount), and outputs a detection signal thereof to the master pressure control unit 52. The temperature sensor 42 detects a temperature of the electric motor 38, and outputs a detection signal thereof to the master pressure control unit 52.

The speed reduction mechanism 43 is configured as, for example, a belt speed reduction mechanism. The speed reduction mechanism 43 includes a driving pulley 43A, a driven pulley 43B, and a belt 43C. The driving pulley 43A is attached to the rotational shaft 38A of the electric motor 38. The driven pulley 43B is attached to the cylindrical rotational member 44. The belt 43C is wound around between them. The speed reduction mechanism 43 transmits the rotation of the rotational shaft 38A of the electric motor 38 to the cylindrical rotational member 44 while slowing down this rotation at the predetermined speed reduction rate. The cylindrical rotational member 44 is rotatably supported by the booster housing 32 via a roller bearing 45.

The rotation-linear motion conversion mechanism 46 is configured as, for example, a ball-screw mechanism. The rotation-linear motion conversion mechanism 46 includes the cylindrical (hollow) linear motion member 47 provided axially movably via a plurality of balls on an inner peripheral side of the cylindrical rotational member 44. For example, the linear motion member 47 can form the assist member together with the power piston 48. The power piston 48 is inserted inside the linear motion member 47 from an opening of the linear motion member 47 on the other axial side thereof. Further, the other axial end of the linear motion member 47 is in abutment with the flange portion 48B of the power piston 48. Due to this abutment, the linear motion member 47 can be displaced to the other axial side (the front side) integrally with the power piston 48 on the inner peripheral side of the cylindrical rotational member 44.

The power piston 48 is actuated (driven) by the electric actuator 37 to generate the hydraulic pressure in the master cylinder 21 (apply the brake hydraulic pressure to each of the wheel cylinders 4L, 4R, 5L, and 5R). In other words, the power piston 48 forms the assist member disposed movably relative to the input member 33, and is axially thrust forward (moved) by the electric actuator 37. The power piston 48 includes a cylindrical portion 48A, the flange portion 48B, and an annular abutment portion 48C. An input piston 35 of the input member 33 is fittedly inserted inside the cylindrical portion 48A axially relatively displaceably (slidably movably). The other end of the linear motion member 47 is in abutment with the flange portion 48B. The annular abutment portion 48C faces (confronts) the reaction disk 50 together with the pressure reception portion 35B of the input piston 35.

A second return spring 49 is provided between the flange portion 48B of the power piston 48 and the booster housing 32. The second return spring 49 constantly biases the power piston 48 in a braking release direction. Due to this configuration, the power piston 48 is returned to an initial position illustrated in FIG. 2 due to a driving force from a rotation of the electric motor 38 to a braking release side and the biasing force of the second return spring 49 when the brake operation is released.

The reaction disk 50 is the reaction force distribution member provided between the input member 33 (the input piston 35) and the power piston 48, and the output rod 51. The reaction disk 50 is formed into a disk-like shape with use of, for example, an elastic resin material such as rubber, and is in abutment with the input member 33 and the power piston 48. The reaction disk 50 transmits, to the output rod 51, the pressing force transmitted from the brake pedal 6 to the input member 33 (the input piston 35) (a thrust force) and the thrust force transmitted from the electric actuator 37 to the power piston 48 (the annular abutment portion 48C) (a booster thrust force). This means that the reaction disk 50 transmits a reaction force of the brake hydraulic pressure generated in the master cylinder 21 to the input member 33 and the power piston 48 while distributing it therebetween as the reaction force distribution member.

The output rod 51 functions to output the thrust force of the input member 33 and/or the thrust force of the power piston 48 to the master cylinder 21 (the primary piston 23 thereof). The output rod 51 includes a large-diameter flange portion 51A provided on one end side thereof. The flange portion 51A is fitted to the annular abutment portion 48C of the power piston 48 from outside while sandwiching the reaction disk 50 therebetween. The output rod 51 presses the primary piston 23 of the master cylinder 21 based on the thrust force of the input member 33 and/or the thrust force of the power piston 48.

Now, the rotation-linear motion conversion mechanism 46 has back-drivability, and can cause the cylindrical rotational member 44 to be rotated with the aid of the linear motion (the axial movement) of the linear motion member 47. As illustrated in FIG. 2, when the power piston 48 is retracted (maximumly retracted) to the return position (the initial position), the linear motion member 47 is brought into abutment with the booster housing 32. The booster housing 32 functions as a stopper that regulates the return position of the power piston 48 via the linear motion member 47.

The other end of the linear motion member 47 is in abutment with the flange portion 48B of the power piston 48 from the rear side (the right side in FIG. 2). This allows the power piston 48 to be separated from the linear motion member 47 and advanced alone. That is, for example, suppose that the electric booster 30 has some abnormality, such as a malfunction of the electric motor 38 due to a disconnection or the like. In this case, the linear motion member 47 is returned to the retracted position together with the power piston 48 due to the spring force of the second return spring 49. This can contribute to prevention of a brake drag. On the other hand, when the braking force is applied, the hydraulic pressure can be generated in the master cylinder 21 by displacing the output rod 51 toward the master cylinder 21 side via the reaction disk 50 based on the advancement of the input member 33. At this time, when the input member 35 is advanced by a predetermined amount, a front end of the piston main body 35A of the input piston 35 is brought into abutment with the power piston 48 (an inner wall thereof). As a result, the hydraulic pressure can be generated in the master cylinder 21 based on the advancements of both the input member 33 and the power piston 48.

The speed reduction mechanism 43 is not limited to the belt speed reduction mechanism, and may be constructed with use of another type of speed reduction mechanism, such as a gear reduction mechanism. Further, the rotation-linear motion conversion mechanism 46, which converts the rotational motion into the linear motion, can also be constructed with use of, for example, a rack and pinion mechanism. Further, the speed reduction mechanism 43 does not necessarily have to be provided. For example, the electric booster 30 may be configured in such a manner that the cylindrical rotational member 44 is rotated directly by the electric motor, with the rotor of the electric motor provided at the cylindrical rotational member 44 and the stator of the electric motor also disposed around the cylindrical rotational member 44. Further, in the embodiment, the rotation-linear motion conversion mechanism 46 and the power piston 48 are prepared as different members from each other, but may be prepared while a part of each of them is integrated. For example, the power piston 48 and the linear motion member 47 of the rotation-linear motion conversion mechanism 46 may be integrated with each other. In other words, the assist member can be formed by the "power piston 48" and the "linear motion member 47 prepared as a member different from or a member integrated with the power piston 48".

Next, the master pressure control unit 52, which serves as the electric booster ECU, will be described.

The master pressure control unit 52 controls the electric booster 30 (the master pressure control mechanism 31 thereof). More specifically, the master pressure control unit 52 causes the brake hydraulic pressure (the M/C hydraulic pressure) to be generated in the master cylinder 21 by driving and controlling the electric booster 30. The master pressure control unit 52 includes, for example, a microcomputer, a driving circuit, and an electric power source circuit. The master pressure control unit 52 is an electric booster control unit that electrically drives and controls the electric motor 38. An input side of the master pressure control unit 52 is connected to the displacement sensor 7, the rotational angle detection sensor 40, and the vehicle data bus 12. The displacement sensor 7 detects the operation amount of the brake pedal 6 (the movement amount of the input member 33 corresponding thereto). The rotational angle detection sensor 40 detects the rotational position of the electric motor 38 (the movement amount of the power piston 48 corresponding thereto). The vehicle data bus 12 provides and receives a signal to and from another vehicle device (for example, the wheel pressure control unit 10). On the other hand, an output side of the master pressure control unit 52 is connected to the electric motor 38 and the vehicle data bus 12.

The master pressure control unit 52 drives the electric motor 38 so as to increase the pressure in the master cylinder 21 according to the detection signal output from the displacement sensor 7 (the brake pedal operation amount, i.e., an input member position). More specifically, the master pressure control unit 52 moves (displaces) the power piston 48 by controlling the electric actuator 37 (the electric motor 38) based on a braking instruction value based on the operation performed on the brake pedal 6 (the input member position). In this case, the master pressure control unit 52 detects the relative position between the input member 33 and the power piston 48, and drives and controls the electric actuator 37 (the electric motor 38). In other words, the master pressure control unit 52 variably controls the braking hydraulic pressure to generate in the master cylinder 21 by driving the electric motor 38 based on the input member position and moving the power piston 48.

FIG. 3 is a circuit block diagram illustrating a circuit configuration of the master pressure control unit 52 and the master pressure control mechanism 31. As illustrated in this drawing, FIG. 3, the master pressure control unit 52 includes a central processing unit 52A, a three-phase motor driving circuit 52B, a rotational angle detection sensor interface 52C, an electric current sensor interface 52D, a displacement sensor interface 52E, a temperature sensor interface 52F, and a master cylinder pressure sensor interface 52G. The central processing unit 52A is a central processing unit called a CPU. The three-phase motor driving circuit 52B outputs a driving electric current to the electric motor 38, which is the three-phase DC brushless motor, according to an instruction from the central processing unit 52A. The rotational angle detection sensor interface 52C is a connection circuit (a coupling circuit) for allowing the detection signal from the rotational angle detection sensor 40 to be received by the central processing unit 52A. The electric current sensor interface 52D is a connection circuit for allowing the detection signal from the electric current sensor 41 to be received by the central processing unit 52A. The displacement sensor interface 52E is a connection circuit for allowing the detection signal from the displacement sensor 7, which is the brake operation sensor, to be received by the central processing unit 52A. The temperature sensor interface 52F is a connection circuit for allowing the detection signal from the temperature sensor 42 to be received by the central processing unit 52A. The master cylinder pressure sensor interface 52G is a connection circuit for allowing the detection signal from the hydraulic sensor 15 to be received by the central processing unit 52A.

Further, the master pressure control unit 52 includes a CAN communication interface 52H, a memory 52I, a first electric power source circuit 52J, a second electric power source circuit 52K, a monitoring control circuit 52L, a fail-safe relay 52M, an ECU electric power source relay 52N, and a filter circuit 52P. The CAN communication interface 52H is a connection circuit for allowing a CAN signal from various kinds of vehicle apparatuses including the wheel pressure control unit 10 to be received by the central processing unit 52A. The memory 52I stores therein various kinds of information for allowing the central processing unit 52A to perform the processing, and is constructed with use of, for example, an EEPROM. The memory 52I stores therein, for example, a processing program for performing the processing flow illustrated in FIG. 7, which will be described below (a processing program used for control processing for driving the power piston 48). The first electric power source circuit 52J and the second electric power source circuit 52K supply stable electric currents to various kinds of circuits of the master pressure control unit 52 including the central processing unit 52A. The monitoring control circuit 52L monitors an abnormality in the central processing unit 52A, the first electric power source circuit 52J, and the second electric power source circuit 52K. The fail-safe relay 52M switches a connection and disconnection between the electric power source line 13 and the three-phase motor driving circuit 52B. The ECU electric power source relay 52N switches a connection and disconnection between the electric power source line 13, and the first electric power source circuit 52J and the second electric power source circuit 52K. The filter circuit 52P removes noise of the electric power from the electric power source line 13.

Based on various kinds of detection signals from the rotational angle detection sensor 40, the displacement sensor 7, the temperature sensor 42, the hydraulic sensor 15, and the like, various kinds of information indicated by CAN signals from various kinds of vehicle devices and the like including the wheel pressure control unit 10, information stored in the memory 52I, and the like, the central processing unit 52A processes them according to a predetermined logical rule. In other words, the central processing unit 52A calculates the instruction that should be output to the three-phase motor driving circuit 52B based on the various kinds of detection signals, the various kinds of information, the stored information, and the like. The central processing unit 52A outputs the instruction signal to the three-phase motor driving circuit 52B to control the actuation of the electric motor 38 based on the calculated instruction.

Electric power is supplied from the electric power source line 13 to the first electric power source circuit 52J and the second electric power source circuit 52K via the ECU electric power relay 52N. At this time, when the CAN signal is received by the CAN communication interface 52H or a predetermined actuation signal W/U from an ignition switch, a brake switch, a door switch (none of them illustrated), or the like is received, the ECU electric power source relay 52N supplies the electric power to the first electric power source circuit 52J and the second electric power source circuit 52K. Further, the electric power of the electric power source line 13 is supplied to the three-phase motor driving circuit 52B via the filter circuit 52P and the fail-safe relay 52M. At this time, the filter circuit 52P removes the noise of the electric power to supply to the three-phase motor driving circuit 52B.

Each phase of three-phase outputs from the three-phase motor driving circuit 52B is monitored by a phase electric current monitor circuit 52Q and a phase voltage monitor circuit 52R. The central processing unit 52A carries out a failure diagnosis of the master pressure control unit 52 based on values monitored by them, failure information stored in the memory 52I, and the like. When determining that a failure has occurred, the central processing unit 52A outputs a failure signal to the monitoring control circuit 52L. The monitoring control circuit 52L actuates the fail-safe relay 52M to stop the supply of the electric power to the three-phase motor driving circuit 52B at the time of the failure based on the failure signal from the central processing unit 52A and various kinds of actuation information such as voltages of the first electric power source circuit 52J and the second electric power source circuit 52K.

Now, the master pressure control unit 52 actuates the electric motor 38 to control the position of the primary piston 23 to cause the hydraulic pressure to be generated based on the displacement amount of the brake pedal 6 that is detected by the displacement sensor 7. More specifically, the master pressure control unit 52 supplies the electric current to the electric motor 38 via the three-phase motor driving circuit 52B according to the amount of the displacement (the amount of the movement) of the input member 33 that is caused by the brake pedal 6. Then, when the electric current is supplied from the master pressure control unit 52 to the electric motor 38, the rotational shaft 38A of the electric motor 38 is rotationally driven. The rotation of the rotational shaft 38A is slowed down by the speed reduction mechanism 43, and is converted into the linear displacement of the liner motion member 47 (the displacement in the horizontal direction in FIG. 2) by the rotation-linear motion conversion mechanism 46. The linear motion member 47 is displaced leftward in FIG. 2 integrally with the power piston 48, and the displacement of the power piston 48 is transmitted to the primary piston 23 of the master cylinder 21 via the reaction disk 50. At this time, the reaction force derived from the hydraulic pressure applied to the primary piston 23 is fed back to the brake pedal 6 via the reaction disk 50 and the input member 33 (the input piston 35 and the input rod 34). Then, a boosting ratio, which is a ratio between the operation amount of the brake pedal 6 and the generated hydraulic pressure, can be adjusted based on the relative positional relationship of the booster piston 48 to the input rod 35.

Figure 4:
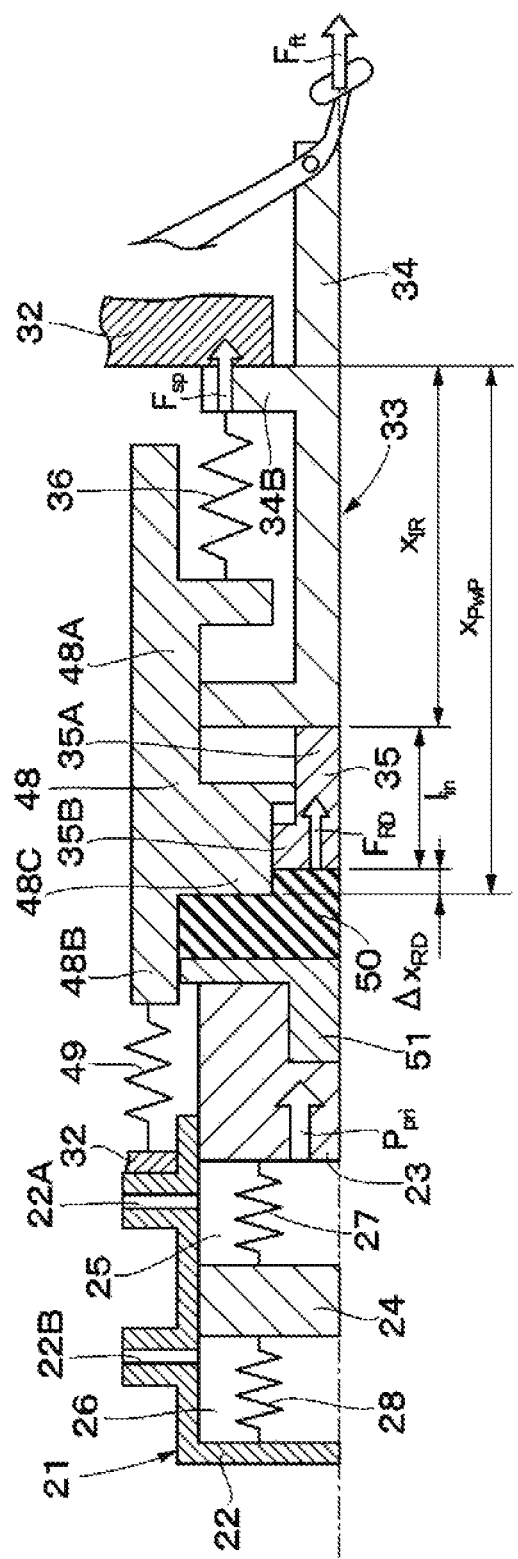

The force of pressing the brake pedal 6 that is required when the hydraulic pressure is generated will be described with reference to FIG. 4. FIG. 4 is a half cross-sectional view schematically illustrating the power piston 48, the input member 33, the reaction disk 50, the output rod 51, the master cylinder 21, and the like of the electric booster 30 illustrated in FIG. 2.

When the hydraulic pressure is generated in the first hydraulic chamber 25, which serves as the primary chamber, the reaction disk 50 is elastically deformed and is brought into abutment with the input piston 35, thereby causing a reaction disk reaction force (an RD reaction force) to be applied to the input piston 35. This reaction force is generated according to a gap amount (an RD gap: $\Delta X_{RD}$) between the left end of the power piston 48 (the annular abutment portion 48C thereof) and the left end of the input piston 35 (the pressure reception portion 35B thereof), and a hydraulic pressure $P_{pri}$ generated in the first hydraulic chamber 25.

Figure 5:
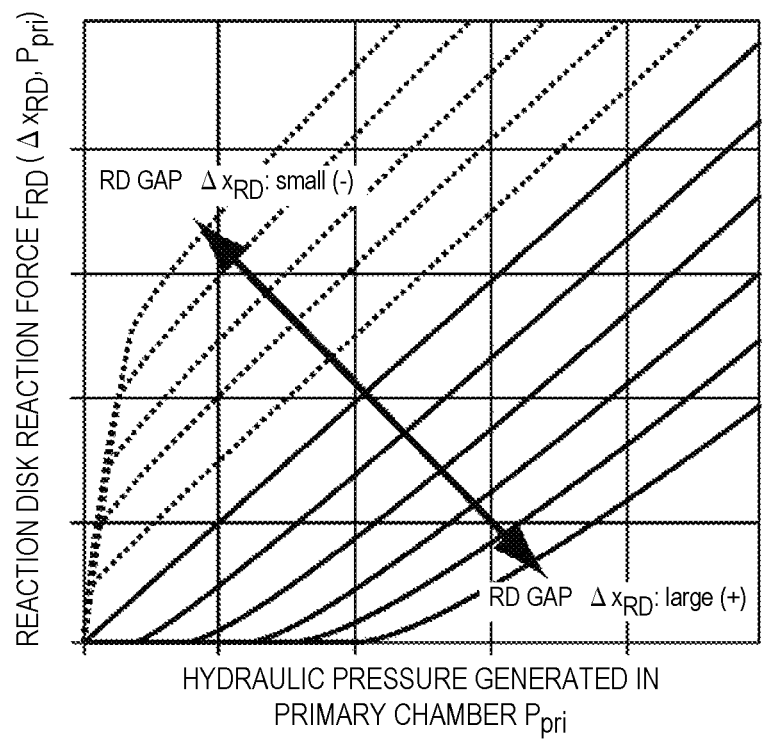
FIG. 5 illustrates a characteristic line indicating a reaction force characteristic FRD of the reaction disk (RD).

From this fact, the reaction disk reaction force can be represented by $F_{RD}(\Delta X_{RD}, P_{pri})$, and, for example, exhibits a characteristic like an example illustrated in FIG. 5. FIG. 5 illustrates a relationship between the hydraulic pressure $P_{pri}$ generated in the first hydraulic chamber 25 and the reaction disk reaction force $F_{RD}$ for each value of the RD gap $\Delta X_{RD}$.

Now, a difference in the reaction disk reaction force $F_{RD}$ according to the RD gap $\Delta X_{RD}$ is generated due to the elastic deformation of the reaction disk 50, and the reaction disk reaction force $F_{RD}$ is generated according to a ratio between power-receiving areas of the power piston 48 and the input piston 35 after the reaction disk 50 is brought into full abutment with the input piston 35.

As illustrated in FIG. 4, $l_{in}$, $x_{PWP}$, and $x_{IR}$ represent the length of the input piston 35, the position of the power piston 48, and the position of the input rod 34, respectively. In this case, the RD gap $\Delta x_{RD}$ can be expressed as the following equation, an equation 1.

$$\Delta x_{RD} = x_{pwp} - x_{IR} - l_{in} \quad \text{[Equation 1]}$$

Further, a spring reaction force biased by the first return spring 36 mounted between the power piston 48 and the input rod 34 is applied to the input rod 34. Assuming that ksp and Fset represent a spring constant and a set load of the first return spring 36, respectively, the spring reaction force $F_{sp}(\Delta x_{RD'})$ generated according to the RD gap $\Delta RD$ can be expressed as the following equation, an equation 2.

$$F_{sp}(\Delta x_{RD'}) = -k_{sp}(x_{pwp} - x_{IR}) + F_{set} = -k_{sp}(\Delta x_{RD} + l_{in}) + F_{set} \quad \text{[Equation 2]}$$

Further, assuming that $R_{Pdl}$ represents a pedal ratio of the brake pedal 6, a pedal pressing force $F_{fl}(\Delta x_{RD}, P_{pri})$ necessary when the hydraulic pressure $P_{pri}$ is generated in the first hydraulic chamber 25 can be expressed as the following equation, an equation 3 according to the RD gap $\Delta x_{RD}$.

$$F_{fl}(\Delta x_{RD}, P_{pri}) = (F_{RD}(\Delta x_{Rd}, P_{pri}) + F_{sp}(\Delta x_{RD'}))/R_{Pdl} \quad \text{[Equation 3]}$$

In other words, the pedal pressing force $F_{fl}(\Delta X_{RD}, P_{pri})$ necessary for the hydraulic pressure $P_{pri}$ in the first hydraulic chamber 25 can be controlled by controlling the RD gap $\Delta x_{RD}$ (the relative displacement between the power piston 48 and the input rod 34).

Figure 18:
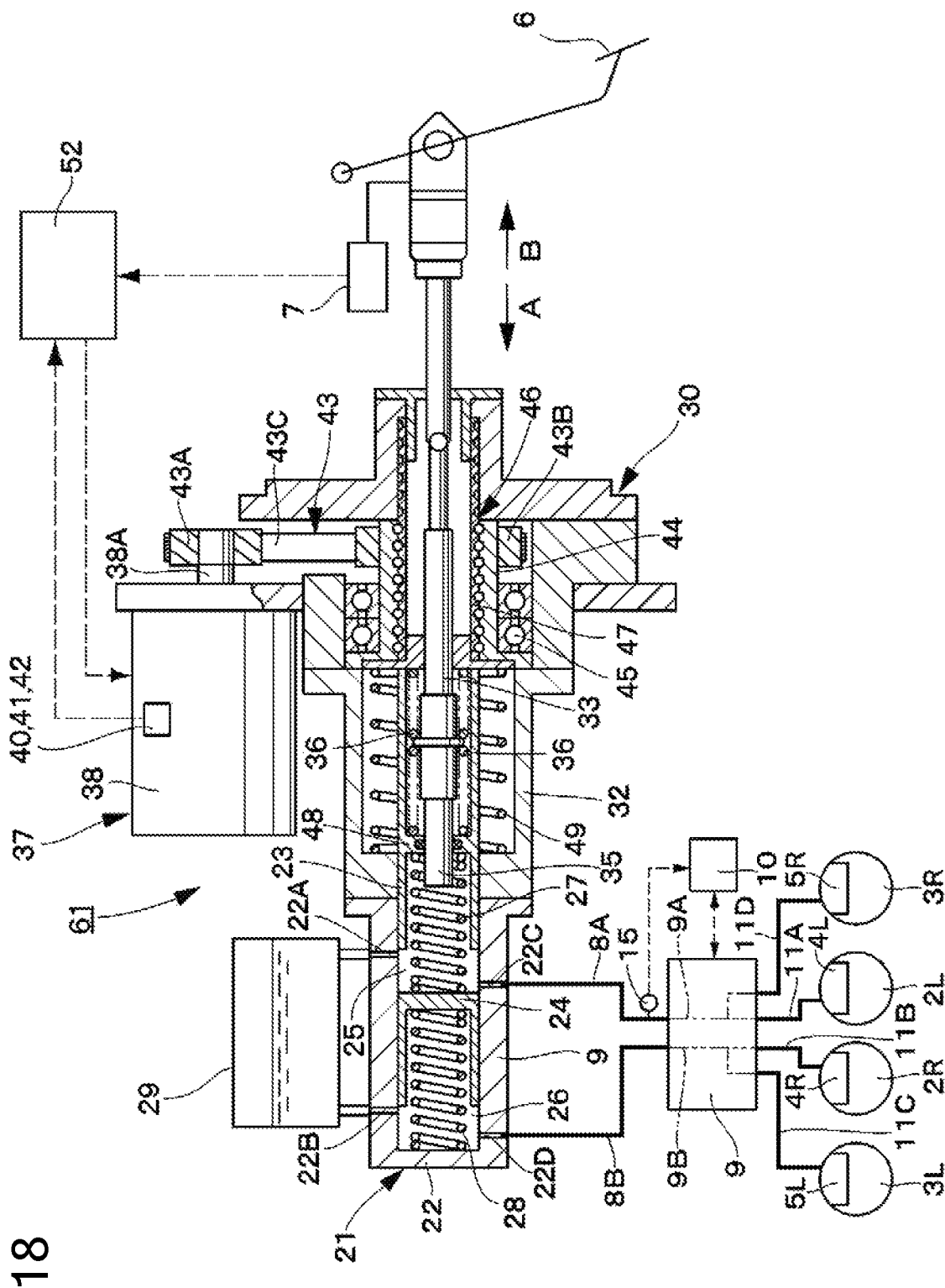
FIG. 18 schematically illustrates an electric booster according to a first modification.

The first embodiment (and second and third embodiments, which will be described below) has been described referring to the electric booster 30 in which the input piston 35 receives the hydraulic pressure generated in the first hydraulic chamber 25 via the reaction disk 50 by way of example. However, the electric booster is not limited thereto. For example, the pedal pressing force $F_{fl}$ can also be controlled on an electric booster 61, in which the input piston 35 directly receives the hydraulic pressure generated in the first hydraulic chamber 25, like a first modification illustrated in FIG. 18. In this case, assuming that $A_{IR}$ represents the pressure-receiving area of the input piston 35, the pedal pressing force $F_{fl}$ can be expressed as the following equation, an equation 4 with use of the position $x_{PWP}$ of the power piston 48 and the position $x_{IR}$ of the input rod 34.

$$F_{fl}(x_{PWP}, x_{IR}, P_{pri}) = (A_{IR} P_{pri} + F_{sp}(x_{PWP}, x_{IR}))/R_{Pdl} \quad \text{[Equation 4]}$$

Then, according to the technique like the invention discussed in PTL 1, the electric booster is configured in such a manner that the reaction force applied to the brake pedal (the pedal reaction force) changes according to the positional relationship between the input member and the assist member. In the case of this technique, the pedal reaction force changes depending on a response time of the assist member, and this makes it difficult to arbitrarily change the pedal reaction force according to, for example, a speed at which the brake pedal is pressed (a speed at which the input member is moved). Further, in the case of the above-described technique, changing the pedal reaction force raises the necessity of changing a hardware configuration, such as changing the spring reaction force. For this reason, the above-described technique necessitates a change in the hardware specifications for each kind of vehicle type (vehicle type), thereby leading to a possibility of, for example, a reduction in production efficiency and an increase in manufacturing cost.

On the other hand, in the embodiment, a reaction force characteristic (a pedal reaction force characteristic or a characteristic of the hydraulic reaction force applied to the pedal) can be changed by the master pressure control unit 52 as the control portion. More specifically, the master pressure control unit 52 sets a target movement amount of the power piston 48 according to the amount of the movement of the input member 33 that is caused by the brake pedal 6. Because the movement amount and the position correspond to each other, the position (a target position) may be used as the movement amount (the target movement amount) (the movement amount is assumed to include the position). Then, the master pressure control unit 52 controls the electric actuator 37 (the electric motor 38) to move the power piston 48 so as to achieve the target movement amount, thereby generating the brake hydraulic pressure in the master cylinder 21. In this case, the master pressure control unit 52 includes a reaction force generation portion, which changes the characteristic of the hydraulic reaction force applied to the brake pedal 6 (for example, a reference relative displacement calculator 53, a relative displacement correction amount calculator 55, and an addition portion 56 illustrated in FIG. 6, which will be described below, i.e., processing in S3, S4, and S5 illustrated in FIG. 7, which will be described below). Then, this reaction force generation portion corrects (changes) the target movement amount according to a temporal change in the movement amount of the input member 33. More specifically, in the embodiment, the reaction force generation portion changes the pedal pressing force (a pedal feeling) by correcting the relative displacement between the power piston 48 and the input member 33 (the input rod 34) according to the speed at which the brake pedal 6 is operated. In other words, the reaction force generation portion changes the pedal reaction force by correcting the position of the power piston 48 relative to the stroke of the input member 33 according to the speed at which the brake pedal 6 is pressed.

Figure 6:
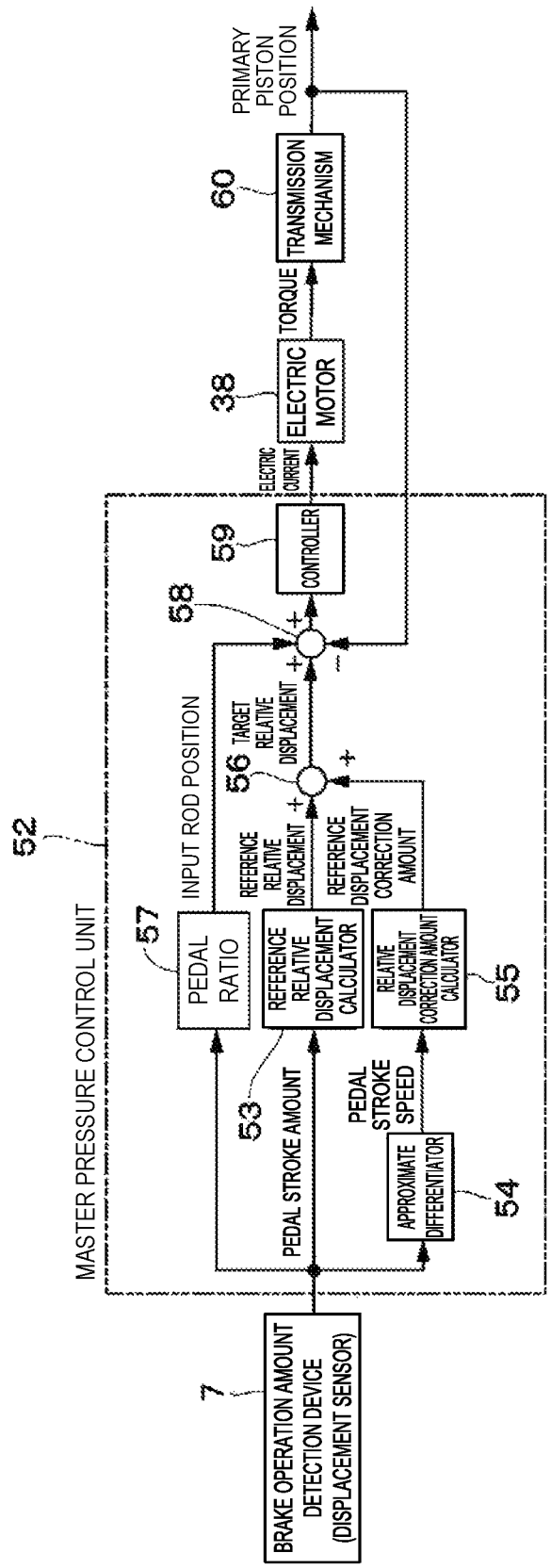
FIG. 6 is a control block diagram illustrating a control content of the master pressure control unit illustrated in FIG. 3.

FIG. 6 is a control block diagram illustrating the control content of the master pressure control unit 52. As illustrated in this drawing, FIG. 6, the master pressure control unit 52 includes the reference relative displacement calculator 53, an approximate differentiator 54, the relative displacement correction amount calculator 55, the addition portion 56, a pedal ratio calculation portion 57, a calculation portion 58, and a controller 59. The pedal stroke amount is input from the displacement sensor 7 to the reference relative displacement calculator 53. The reference relative displacement calculator 53 calculates a reference relative displacement based on the pedal stroke amount from the displacement sensor 7, and outputs this reference relative displacement to the addition portion 56. The pedal stroke amount is input from the displacement sensor 7 to the approximate differentiator calculator 54. The approximate differentiator 54 calculates a pedal stroke speed based on the pedal stroke amount from the displacement sensor 7, and outputs this pedal stroke speed to the relative displacement correction amount calculator 55.

The pedal stroke speed is input from the approximate differentiator 54 to the relative displacement correction amount calculator 55. The relative displacement correction amount calculator 55 forms a reaction force characteristic change portion for changing the characteristic of the hydraulic reaction force applied to the brake pedal 6 according to the speed of the brake pedal 6, together with the addition portion 56. The relative displacement correction amount calculator 55 calculates a relative displacement correction amount based on the pedal stroke speed from the approximate differentiator 54, and outputs this relative displacement correction amount to the addition portion 56. The reference relative displacement and the relative displacement correction amount are input from the reference relative displacement calculator 53 and the relative displacement correction amount calculator 55 to the addition portion 56, respectively. The addition portion 56 calculates a target relative displacement by adding the reference relative displacement from the reference relative displacement calculator 53 and the relative displacement correction amount from the relative displacement correction amount calculator 55, and outputs this target relative displacement to the calculation portion 58. The pedal stroke amount is input from the displacement sensor 7 to the pedal ratio calculation portion 57. The pedal ratio calculation portion 57 calculates the input rod position based on the pedal stroke amount from the displacement sensor 7 and a preset pedal ratio, and outputs this input rod position to the calculation portion 58.

The target relative displacement, the input rod position, and a primary piston position are input to the calculation portion 58. The primary piston position can be calculated (estimated) from, for example, the hydraulic value in the master cylinder 21 that is output from the hydraulic sensor 15. Alternatively, as the primary piston position, the position of the primary piston 23 (or the position of the output rod 51) can be directly detected with use of a position sensor or the like. The calculation portion 58 calculates a control instruction by reducing the primary piston position from a value acquired by adding the target relative displacement and the input rod position, and outputs this control instruction to the controller 59. The calculation portion 58 corresponds to a feedback portion that calculates, based on the value acquired by adding the target relative displacement and the input rod position, and the primary piston position, a difference therebetween (a positional difference). The control instruction is input from the calculation portion 58 to the controller 59. The controller 59 supplies an electric current for realizing this control instruction to the electric motor 38 based on the control instruction from the calculation portion 58. An output (a torque) of the electric motor 38 is transmitted to the primary piston 23 in the master cylinder 21 via the speed reduction mechanism 43, the cylindrical rotational member 44, the rotation-linear motion conversion mechanism 46, the power piston 48, and the output rod 51, which form a transmission mechanism 60.

Figure 7:
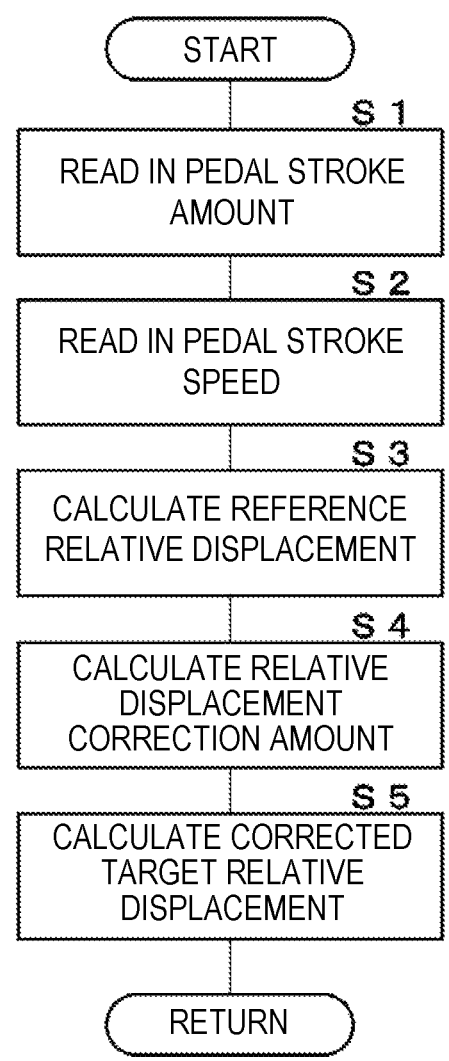
FIG. 7 is a flowchart illustrating control processing performed by the master pressure control unit illustrated in FIG. 3.

FIG. 7 illustrates the control processing performed by the master pressure control unit 52, i.e., the processing flow for calculating the target relative displacement. The control processing illustrated in FIG. 7 is repeatedly performed per predetermined control cycle while electric power is kept supplied to the master pressure control unit 52. As illustrated in FIG. 7, in S1, the master pressure control unit 52 reads in the pedal stroke amount of the displacement sensor 7. In a subsequent step, S2, the master pressure control unit 52 reads in the pedal stroke speed (for example, calculates the pedal stroke speed based on the change in the pedal stroke amount of the displacement sensor 7). In a subsequent step, S3, the master pressure control unit 52 calculates the reference relative displacement based on the pedal stroke amount read in S1. In a subsequent step, S4, the master pressure control unit 52 calculates the relative displacement correction amount based on the pedal stroke speed read in S2. In a subsequent step, S5, the master pressure control unit 52 calculates the target relative displacement (i.e., a corrected target relative displacement) based on the reference relative displacement calculated in S4 and the relative displacement correction amount calculated in S4 (for example, by adding the reference relative displacement and the relative displacement correction amount). After calculating the target relative displacement (=the corrected target relative displacement), the master pressure control unit 52 returns to START via RETURN, and repeats the processing in S1 and the steps subsequent thereto.

As illustrated in FIGS. 6 and 7, the master pressure control unit 52 acquires the pedal stroke amount of the brake pedal 6 with use of the displacement sensor 7 (S1 in FIG. 7), and calculates the pedal stroke speed with use of the approximate differentiator 54 based on this pedal stroke amount (S2 in FIG. 7). The pedal stroke speed may be estimated by constructing a known observer or the like, instead of using the approximate differentiator 54. Alternatively, the electric booster 30 may be configured to include a unit that directly acquires the pedal stroke speed (a sensor) in addition to the displacement sensor 7.

The reference relative displacement calculator 53 calculates the reference relative displacement based on the pedal stroke amount with use of a preset calculation equation, a preset map, or the like (S3 in FIG. 7). The relative displacement correction amount calculator 55 calculates the relative displacement correction amount based on the pedal stroke speed with use of a preset calculation equation, a preset map, or the like (S4 in FIG. 7). Then, the sum of them is set as the target relative displacement (the corrected target relative displacement) (S5 in FIG. 7). The master pressure control unit 52 can acquire a desired pedal pressing force characteristic for each pedal stroke speed by performing feedback control or the like with use of the controller 59 so as to realize this target relative displacement.

Figure 8:
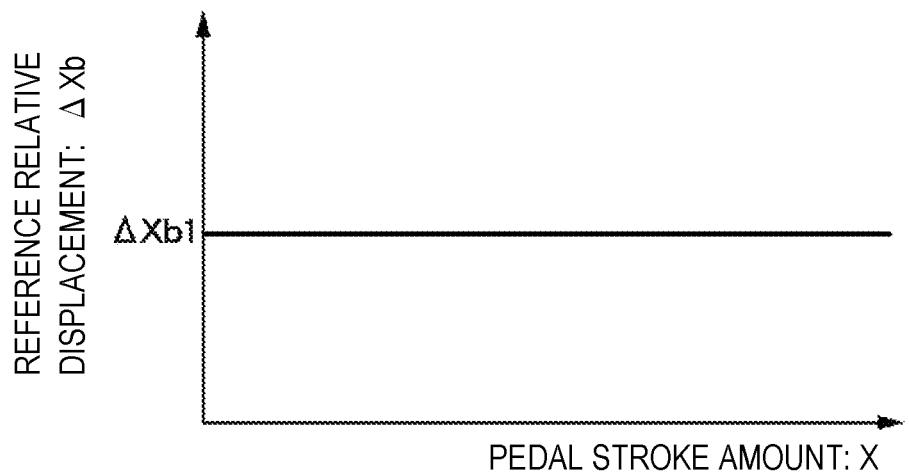
FIG. 8 illustrates a characteristic line indicating one example of a relationship between a pedal stroke amount and a reference relative displacement.

The reference relative displacement can be determined appropriately based on the above-described equation 3 in such a manner that a desired characteristic is satisfied by the hydraulic pressure $P_{pri}$ in the primary chamber (the first hydraulic chamber 25) that is generated in relation to the pedal stroke amount and the pedal pressing force $F_{ft}$. One possible example of the method therefor is to achieve such a characteristic that the reference relative displacement is kept constant with respect to the pedal stroke amount, as illustrated in FIG. 8. In this case, after the reaction disk 50 is brought into full abutment with the input piston 35, the reaction disk reaction force $F_{RD}$ is generated according to the ratio of the pressure-receiving areas of the power piston 48 and the input piston 35, and the spring reaction force $F_{sp}$ is kept constant.

The relative displacement correction amount can be set for each pedal speed so as to increase the RD gap $\Delta x_{RD}$ when the pedal pressing force $F_{ft}$ is desired to reduce. On the other hand, the relative displacement correction amount can be set for each pedal speed so as to reduce the RD gap $\Delta x_{RD}$ when the pedal pressing force $F_{ft}$ is desired to increase.

Figure 9:
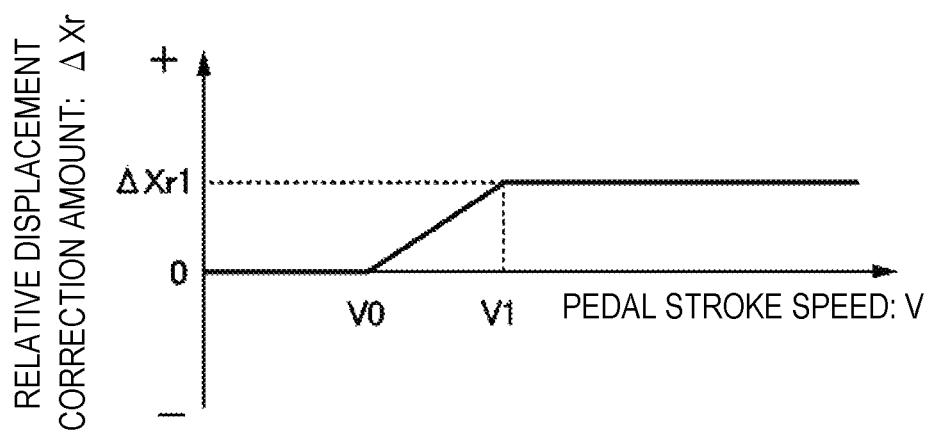
FIG. 9 illustrates a characteristic line indicating a relationship between a pedal stroke speed and a relative displacement correction amount according to a first embodiment.

For example, in the first embodiment, the master pressure control unit 52 increases the relative displacement correction amount (increases the gap amount $\Delta x_{RD}$) when the pedal stroke speed is higher than a predetermined value (for example, V0) as illustrated in FIG. 9. In other words, in the first embodiment, the reaction force generation portion of the master pressure control unit 52 corrects the target movement amount of the power piston 48 in such a manner that it increases as the temporal change in the movement amount of the input member 33 increases. In this case, as illustrated in FIG. 9, the relative displacement correction amount is kept constant (zero) since the pedal stroke speed is zero until the pedal stroke speed reaches the first predetermined value V0, increases (proportionally increases) as the pedal stroke speed increases after the pedal stroke speed exceeds the first predetermined value V0, and is kept constant (a maximum value ΔXr1) when the pedal stroke speed is equal to or higher than a second predetermined value V1.

Figure 10:
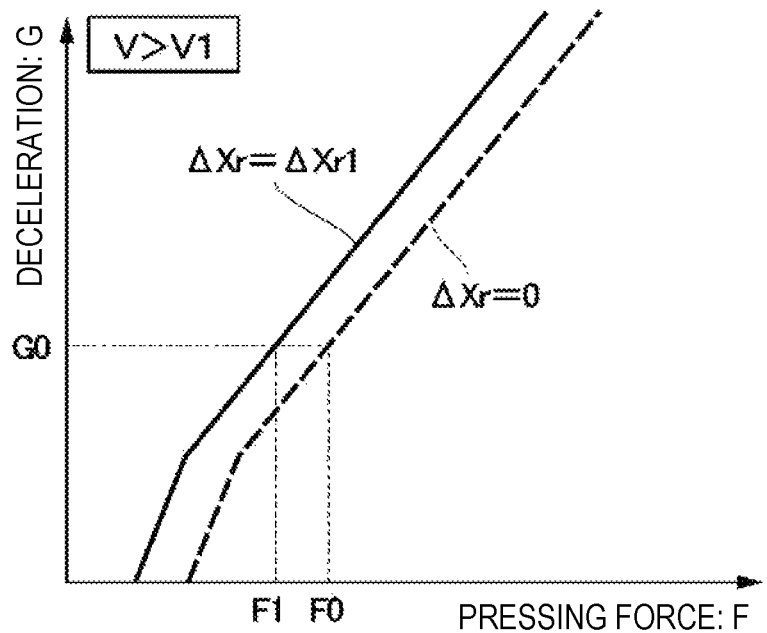
FIG. 10 illustrates characteristic lines each indicating one example of a relationship between a pressing force and a deceleration according to the first embodiment.
Figure 11:
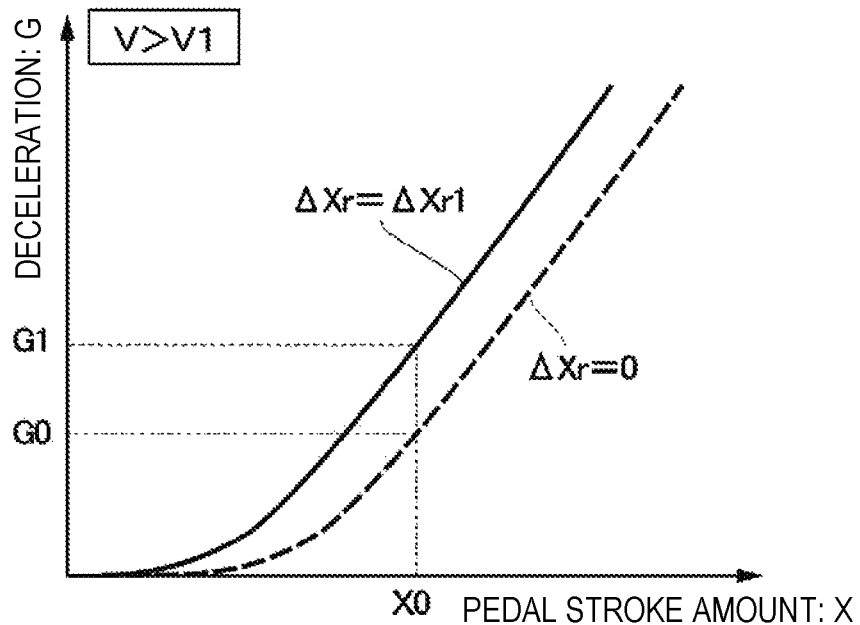
FIG. 11 illustrates characteristic lines each indicating one example of a relationship between the pedal stroke amount and the deceleration according to the first embodiment.

FIG. 10 illustrates relationships between the pedal pressing force and the deceleration (the vehicle deceleration) (a pedal pressing force-deceleration characteristic) when the pedal stroke speed is equal to or higher than V1 (i.e., when the relative displacement correction amount ΔXr is ΔXr1) and when the pedal stroke speed is equal to or lower than V0 (i.e., when the relative displacement correction amount ΔXr is zero). Further, FIG. 11 illustrates relationships between the pedal stroke amount and the deceleration (a pedal stroke amount-deceleration characteristic) when the pedal stroke speed is equal to or higher than V1 (i.e., when the relative displacement correction amount ΔXr is ΔXr=ΔXr1) and when the pedal stroke speed is equal to or lower than V0 (i.e., when the relative displacement correction amount ΔXr is ΔXr=0).

As illustrated in FIG. 10, the same deceleration G0 can be generated with a lower pressing force F when the relative displacement correction amount Δxr is set to Δxr1 than when the relative displacement correction amount Δxr is set to zero. In other words, the deceleration G0 can be generated with a lower pressing force by adding the relative displacement correction amount Δxr1 to the reference relative displacement ΔXb1 when the pedal stroke speed is high. Further, as illustrated in FIG. 11, a higher deceleration G can be generated with the same pedal stroke amount X0 F when the relative displacement correction amount Δxr is set to Δxr1 than when the relative displacement correction amount Δxr is set to zero. In other words, a higher deceleration G is generated with the same pedal stroke amount X0 by adding the relative displacement correction amount Δxr1 to the reference relative displacement ΔXb1 when the pedal stroke speed is high. Therefore, using the characteristic illustrated in FIG. 9 (the relationship between the pedal stroke speed V and the relative displacement correction amount Δxr) allows the pressing force F to reduce and the deceleration G to be raised quickly, thereby being able to realize a characteristic that facilitates sudden braking, when the brake pedal 6 is operated quickly (for example, operated at a speed equal to or higher than V1). Further, using the characteristic illustrated in FIG. 9 allows the pressing force F to increase, thereby being able to realize a characteristic that facilitates the adjustment of the deceleration G, when the brake pedal 6 is operated unhurriedly (for example, operated slowly at a speed equal to or lower than V0).

The target relative displacement is calculated separately for the reference relative displacement calculator 53 and the relative displacement correction amount calculator 55 in FIG. 6, but the master pressure control unit 52 may be configured to calculate only a single target relative displacement based on the pedal stroke amount and the pedal stroke speed with use of, for example, an arithmetic equation or a three-dimensional map indicating a desired relationship among the pedal stroke amount, the pedal stroke speed, and the target relative displacement. In other words, the master pressure control unit 52 may be configured to include a target displacement calculation portion that calculates only the single target relative displacement based on the pedal stroke amount and the pedal stroke speed. In this case, this target displacement calculation portion corresponds to the reaction force generation portion that changes the characteristic of the hydraulic reaction force applied to the brake pedal 6. In this case, the target movement amount (the target relative displacement) is also changed (corrected) according to the temporal change in the movement amount of the input member 33 (the pedal stroke speed).

In either case, the master pressure control unit 52 includes the reaction force generation portion that changes the characteristic of the hydraulic reaction force applied to the brake pedal 6 (the reference relative displacement calculator 53, the relative displacement correction amount calculator 55, and the addition portion 56 in FIG. 6, i.e., the processing in S3, S4, and S5 illustrated in FIG. 7), and this reaction force generation portion corrects the target movement amount according to the temporal change in the movement amount of the input member 33 (the movement speed). In this case, the reaction force generation portion changes the reaction force characteristic of the reaction force mechanism that receives the hydraulic reaction force from the master cylinder 21 side (the power piston 48, the input member 33, and the reaction disk 50). More specifically, the reaction force generation portion changes the reaction force characteristic by changing the relative displacement amount of the power piston 48 relative to the input member 33.

The brake system and the electric booster 30 according to the embodiment are configured in the above-described manner, and, next, operations thereof will be described.

When the driver of the vehicle operates the brake pedal 6 by pressing it, the input member 33 of the electric booster 30 coupled with the brake pedal 6 is displaced toward the master cylinder 21 side. The electric actuator 37 of the electric booster 30 is actuated and controlled by the master pressure control unit 52 according to this displacement of the input member 33. More specifically, the master pressure control unit 52 supplies the electric power to the electric motor 38 to rotationally drive the electric motor 38 based on the detection signal from the displacement sensor 7. The rotation of the electric motor 38 is transmitted to the cylindrical rotational member 44 via the speed reduction mechanism 43, and, along therewith, the rotation of the cylindrical rotational member 44 is converted into the axial displacement of the power piston 48 by the rotation-linear motion conversion mechanism 46. According thereto, the power piston 48 of the electric booster 30 is advanced toward the master cylinder 21 side approximately integrally with the input member 33. As a result, the brake hydraulic pressure is generated in the first and second hydraulic chambers 25 and 26 in the master cylinder 21 according to the pressing force (the thrust force) applied from the brake pedal 6 to the input member 33 and the booster thrust force applied from the electric actuator 37 to the power piston 48. On the other hand, the input member 33 coupled with the brake pedal 6 receives the pressure in the first hydraulic chamber 25 via the output rod 51 and the reaction disk 50, and transmits it to the brake pedal 6 as the brake reaction force. As a result, the driver of the vehicle can receive a response to the pressing via the input member 33.

Then, in the first embodiment, the master pressure control unit 52 (the reaction force generation portion thereof) corrects the target movement amount according to the temporal change in the movement amount of the input member 33 (i.e., the pedal speed). In other words, the master pressure control unit 52 (the reaction force generation portion thereof) changes the characteristic of the hydraulic reaction force applied to the brake pedal 6 by correcting the target movement amount according to the movement speed of the input member 33. As a result, the electric booster 30 can realize an arbitrarily pedal feeling (the hydraulic reaction force characteristic) according to the pedal operation speed. In addition, the electric booster 30 can change the pedal feeling without requiring a change in the hardware configuration, thereby allowing the components to be used in common and thus being able to improve the production efficiency and also reduce the manufacturing cost.

In the first embodiment, the master pressure control unit 52 corrects the target movement amount of the power piston 48 in such a manner that it increases (the gap amount $\Delta x_{RD}$ increases) as the temporal change in the movement amount of the input member 33 increases (i.e., the pedal speed increases). Therefore, when the brake pedal 6 is operated quickly, the electric booster 30 requires a lower pressing force to acquire the same deceleration as when the brake pedal 6 is operated slowly (unhurriedly), thereby being able to raise the deceleration quickly when the brake pedal 6 is pressed fast. On the other hand, when the brake pedal 6 is operated unhurriedly, the electric booster 30 requires a greater pressing force to acquire the same deceleration as when the brake pedal 6 is operated quickly, thereby being able to improve operability when the brake pedal 6 is pressed unhurriedly.

In the first embodiment, the master pressure control unit 52 changes the reaction force characteristic of the reaction force mechanism (the power piston 48 and the input member 33) that receives the hydraulic reaction force from the master cylinder 21 side. Therefore, the master pressure control unit 52 can change the pedal feeling by changing the reaction force characteristic of the reaction force mechanism. More specifically, in the first embodiment, the master pressure control unit 52 changes the reaction force characteristic by changing the relative displacement amount of the power piston 48 relative to the input member 33 (adding the relative displacement correction amount $\Delta Xr$). Therefore, the master pressure control unit 52 can change the reaction force characteristic of the reaction force mechanism, i.e., the pedal feeling by changing the relative displacement amount of the power piston 48 relative to the input member 33.

Figure 12:
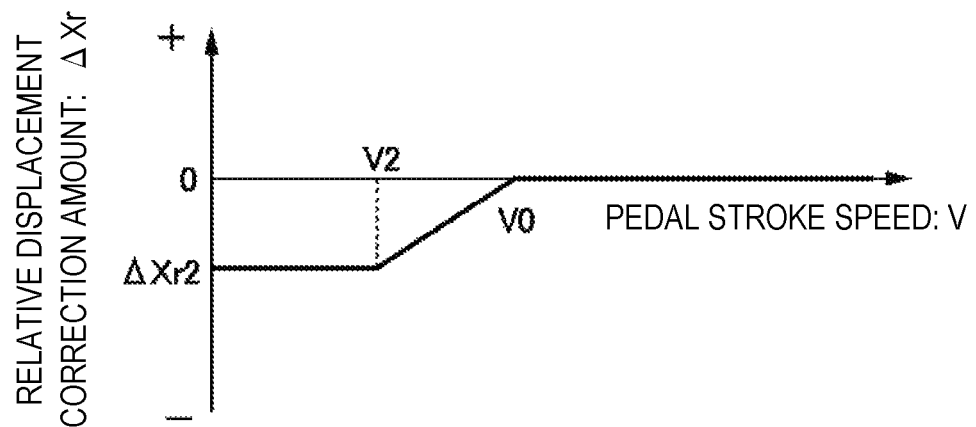
FIG. 12 illustrates a characteristic line indicating a relationship between the pedal stroke speed and the relative displacement correction amount according to a second embodiment.
Figure 13:
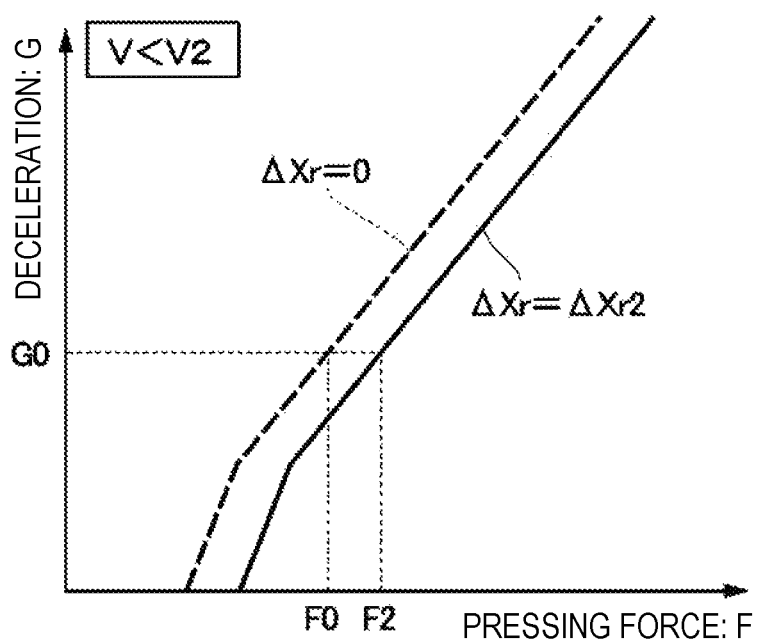
FIG. 13 illustrates characteristic lines each indicating one example of a relationship between the pressing force and the deceleration according to the second embodiment.
Figure 14:
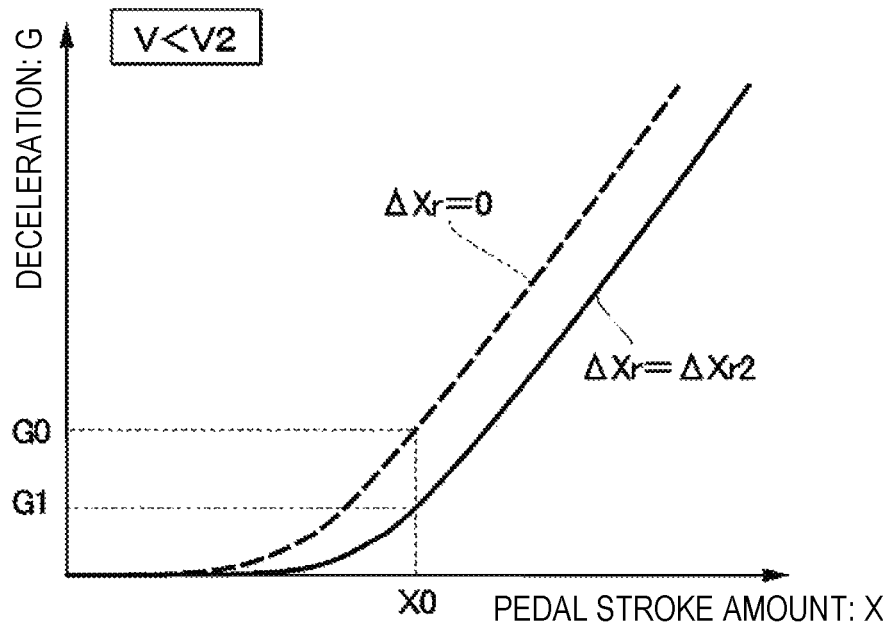
FIG. 14 illustrates characteristic lines each indicating one example of a relationship between the pedal stroke amount and the deceleration according to the second embodiment.

Next, FIGS. 12 to 14 illustrate the second embodiment. The second embodiment is characterized by being configured to correct the target movement amount of the assist member in such a manner that it reduces as the temporal change in the movement amount of the input member reduces. The second embodiment will be described, indicating similar components to the first embodiment by the same reference numerals and omitting descriptions thereof.

In the second embodiment, the master pressure control unit 52 reduces the relative displacement correction amount (reduces the gap amount $\Delta x_{RD}$) when the pedal stroke speed is lower than a predetermined value (for example, V0) as illustrated in FIG. 12. In other words, in the second embodiment, the reaction force generation portion of the master pressure control unit 52 corrects the target movement amount of the power piston 48 in such a manner that it reduces as the temporal change in the movement amount of the input member 33 reduces. In this case, as illustrated in FIG. 12, the relative displacement correction amount is kept constant (a minimum value×$\Delta Xr2$) since the pedal stroke speed is zero until the pedal stroke speed reaches a first predetermined value V2, increases (proportionally increases) as the pedal stroke speed increases after the pedal stroke speed exceeds the first predetermined value V2, and is kept constant (zero) when the pedal stroke speed is equal to or higher than a second predetermined value V0.

FIG. 13 illustrates relationships between the pedal pressing force and the deceleration (pedal pressing force-deceleration characteristics) when the pedal stroke speed is equal to or lower than V2 (i.e., when the relative displacement correction amount $\Delta Xr$ is −$\Delta Xr2$) and when the pedal stroke speed is equal to or higher than V0 (i.e., when the relative displacement correction amount $\Delta Xr$ is zero). Further, FIG. 14 illustrates relationships between the pedal stroke amount and the deceleration (pedal stroke amount-deceleration characteristics) when the pedal stroke speed is equal to or lower than V2 (i.e., when the relative displacement correction amount $\Delta Xr$ is $\Delta Xr$=−$\Delta Xr2$) and when the pedal stroke speed is equal to or higher than V0 (i.e., when the relative displacement correction amount $\Delta Xr$ is $\Delta Xr$=0).

As illustrated in FIG. 13, the same deceleration G0 can be generated with a greater pressing force when the relative displacement correction amount $\Delta xr$ is set to −$\Delta xr2$ than when the relative displacement correction amount $\Delta xr$ is set to zero. In other words, when the pedal stroke speed is low, the deceleration G0 can be generated with a greater pressing force by adding the relative displacement correction amount−$\Delta xr2$ to the reference relative displacement $\Delta Xb1$. Further, as illustrated in FIG. 14, a lower deceleration is generated with the same pedal stroke amount X0 when the relative displacement correction amount $\Delta xr$ is set to −$\Delta xr2$ than when the relative displacement correction amount $\Delta xr$ is set to zero. In other words, a lower deceleration G is generated with the same pedal stroke amount X0 by adding the relative displacement correction amount−$\Delta xr2$ to the reference relative displacement $\Delta Xb1$ when the pedal stroke speed is low. Therefore, using the characteristic illustrated in FIG. 12 (the relationship between the pedal stroke speed V and the relative displacement correction amount $\Delta xr$) allows the pressing force to increase, thereby being able to realize the characteristic that facilitates the adjustment of the deceleration, when the brake pedal 6 is operated unhurriedly (for example, operated slowly at a speed equal to or lower than V2). Further, using the characteristic illustrated in FIG. 12 allows the pressing force F to reduce and the deceleration G to be raised quickly, thereby being able to realize the characteristic that facilitates the sudden braking, when the brake pedal 6 is operated quickly (for example, operated at a speed equal to or higher than V0).

The second embodiment is configured to correct the target movement amount as described above, and a basic operation thereof is not especially different from the operation performed by the first embodiment. In other words, in the case of the second embodiment, the electric booster 30 can also reduce the pressing force when the brake pedal 6 is operated quickly, thereby raising the deceleration quickly when the brake pedal 6 is pressed fast, similarly to the first embodiment. On the other hand, the brake booster 30 can increase the pressing force when the brake pedal 6 is operated slowly (unhurriedly), thereby improving the operability when the brake pedal 6 is pressed unhurriedly.

Figure 15:
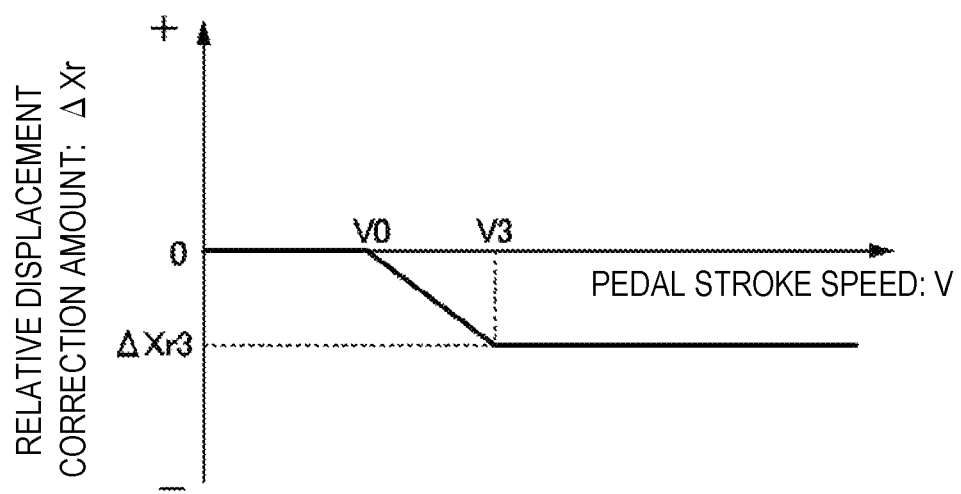
FIG. 15 illustrates a characteristic line indicating a relationship between the pedal stroke speed and the relative displacement correction amount according to a third embodiment.
Figure 16:
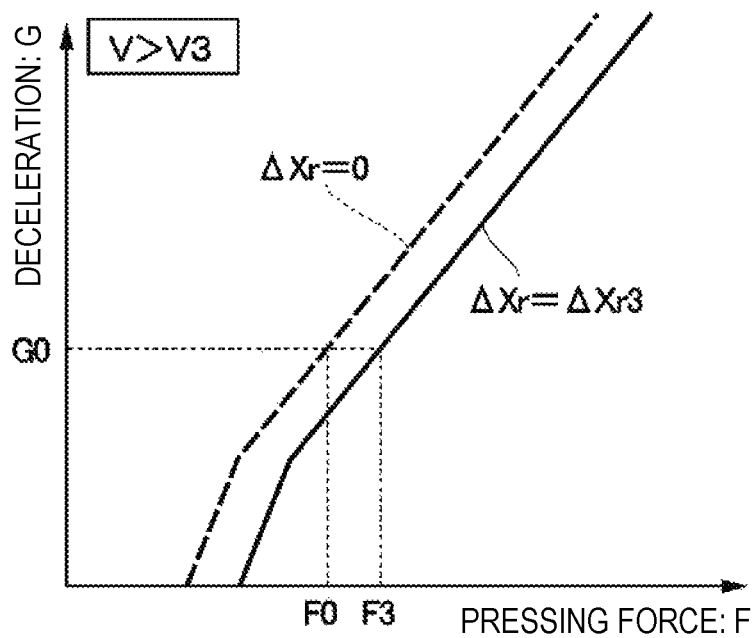
FIG. 16 illustrates characteristic lines each indicating one example of a relationship between the pressing force and the deceleration according to the third embodiment.
Figure 17:
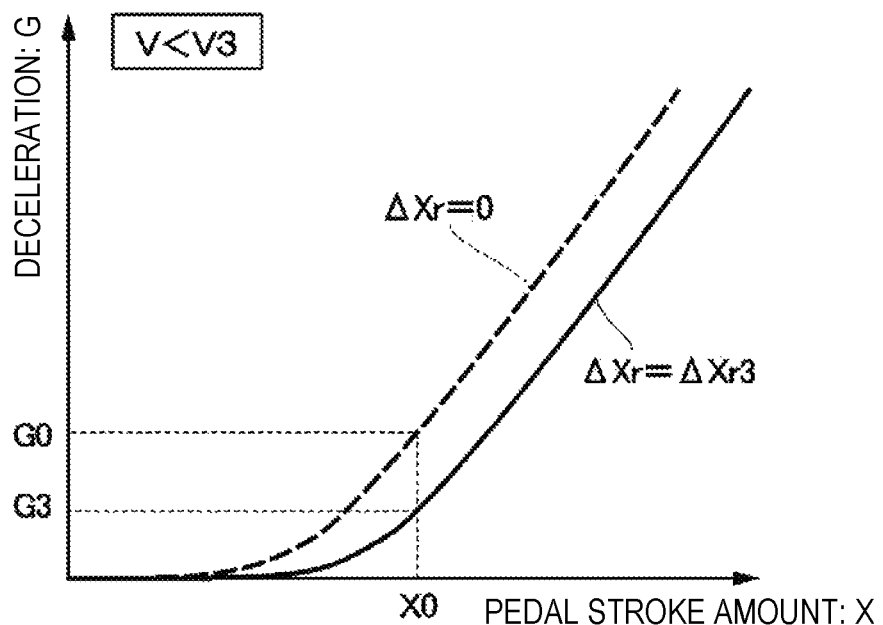
FIG. 17 illustrates characteristic lines each indicating one example of a relationship between the pedal stroke amount and the deceleration according to the third embodiment.

Next, FIGS. 15 to 17 illustrate a third embodiment. The third embodiment is characterized in that the reaction force generation portion is configured to correct the target movement amount of the assist member in such a manner that it reduces as the temporal change in the movement amount of the input member reduces. The third embodiment will be described, indicating similar components to the first embodiment by the same reference numerals and omitting descriptions thereof.

In the third embodiment, the electric booster 30 reduces the relative displacement correction amount (reduces the gap amount $\Delta x_{RD}$) when the pedal stroke speed is higher than a predetermined value (for example, V0) as illustrated in FIG. 15. Conversely, the electric booster 30 increases the relative displacement correction amount (increases the gap amount $\Delta x_{RD}$) when the pedal stroke speed is lower than the predetermined value (for example, V0). In other words, in the third embodiment, the reaction force generation portion of the master pressure control unit 52 corrects the target movement amount of the power piston 48 in such a manner that it reduces as the temporal change in the movement amount of the input member 33 increases. In this case, as illustrated in FIG. 15, the relative displacement correction amount is kept constant (zero) since the pedal stroke speed is zero until the pedal stroke speed reaches the first predetermined value V0, reduces (proportionally reduces) as the pedal stroke speed increases after the pedal stroke speed exceeds the first predetermined value V0, and is kept constant (a minimum value $\Delta Xr3$) when the pedal stroke speed is equal to or higher than a second predetermined value V3.

FIG. 16 illustrates relationships between the pedal pressing force and the deceleration (pedal pressing force-deceleration characteristics) when the pedal stroke speed is equal to or higher than V3 (i.e., when the relative displacement correction amount $\Delta Xr$ is $-\Delta Xr3$) and when the pedal stroke speed is equal to or lower than V0 (i.e., when the relative displacement correction amount $\Delta Xr$ is zero). Further, FIG. 17 illustrates relationships between the pedal stroke amount and the deceleration (pedal stroke amount-deceleration characteristics) when the pedal stroke speed is equal to or higher than V3 (i.e., when the relative displacement correction amount $\Delta Xr$ is $\Delta Xr=-\Delta Xr3$) and when the pedal stroke speed is equal to or lower than V0 (i.e., when the relative displacement correction amount $\Delta Xr$ is $\Delta Xr=0$).

As illustrated in FIG. 16, the same deceleration G0 can be generated with a greater pressing force F when the relative displacement correction amount $\Delta xr$ is set to $\Delta xr3$ than when the relative displacement correction amount $\Delta xr$ is set to zero. In other words, the deceleration G0 can be generated with a greater pressing force by adding the relative displacement correction amount $-\Delta xr3$ to the reference relative displacement $\Delta Xb1$ when the pedal stroke speed is high. Further, as illustrated in FIG. 17, a lower deceleration G is generated with the same pedal stroke amount X0 when the relative displacement correction amount $\Delta xr$ is set to $-\Delta xr3$ than when the relative displacement correction amount $\Delta xr$ is set to zero. In other words, a lower deceleration G is generated with the same pedal stroke amount X0 by adding the relative displacement correction amount $-\Delta xr3$ to the reference relative displacement $\Delta Xb1$ when the pedal stroke speed is high. Therefore, using the characteristic illustrated in FIG. 15 (the relationship between the pedal stroke speed V and the relative displacement correction amount $\Delta xr$) allows the pressing force F to increase, thereby being able to realize the characteristic that facilitates the adjustment of the deceleration G, when the brake pedal 6 is operated quickly (for example, operated at a speed equal to or higher than V3). Further, using the characteristic illustrated in FIG. 15 allows the pressing force F to reduce, thereby being able to realize the characteristic that can raise the deceleration G quickly, when the brake pedal 6 is operated unhurriedly (for example, operated slowly at a speed equal to or lower than V0).

The third embodiment is configured to correct the target movement amount as described above, and a basic operation thereof is not especially different from the operation performed by the first embodiment. Especially, in the third embodiment, the master pressure control unit 52 corrects the target movement amount of the power piston 48 in such a manner that it reduces (the gap amount $\Delta x_{RD}$ reduces) as the temporal change in the movement amount of the input member 33 increases (i.e., the pedal speed increases). Therefore, when the brake pedal 6 is operated quickly, the electric booster 30 requires a greater pressing force to acquire the same deceleration as when the brake pedal 6 is operated unhurriedly (slowly), thereby being able to realize the characteristic that facilitates the adjustment of the deceleration. As a result, the electric booster 30 can prevent the braking force from exceeding the braking force intended by the driver. More specifically, when the brake pedal 6 is operated quickly, reducing the pressing force to acquire a predetermined deceleration may cause the brake pedal 6 to be advanced more than the driver's intention, thereby leading to a greater braking force. On the other hand, in the third embodiment, when the brake pedal 6 is operated quickly, the pressing force to acquire the predetermined deceleration increases, so that the braking force can be prevented from reaching or exceeding the braking force desired by the driver. On the other hand, when the brake pedal 6 is operated unhurriedly, the pressing force reduces and therefore the deceleration can be raised quickly when the brake pedal 6 is pressed unhurriedly.

In the first embodiment, the electric booster 30 has been described referring to the example in which the input piston 35 receives the hydraulic pressure generated in the first hydraulic chamber 25 via the reaction disk 50. In other words, the reaction force mechanism that receives the hydraulic reaction force from the master cylinder 21 side is formed by the input member 33, the power piston 48, and the reaction disk 50. However, the electric booster 30 is not limited thereto. The present invention may also be applied to, for example, the electric booster 61, in which the input piston 35 directly receives the hydraulic pressure generated in the first hydraulic chamber 25, like the first modification illustrated in FIG. 18. In other words, the reaction force mechanism that receives the hydraulic reaction force from the master cylinder 21 side may be formed by the input member 33 and the power piston 48. In this case, assuming that AIR represents the pressure-receiving area of the input piston 35, the pedal pressing force $F_{fi}$ can be expressed as the above-described equation 4 based on the position $X_{PWP}$ of the power piston 48 and the position $x_{IR}$ of the input rod 34. The same also applies to the second and third embodiments.

Figure 19:
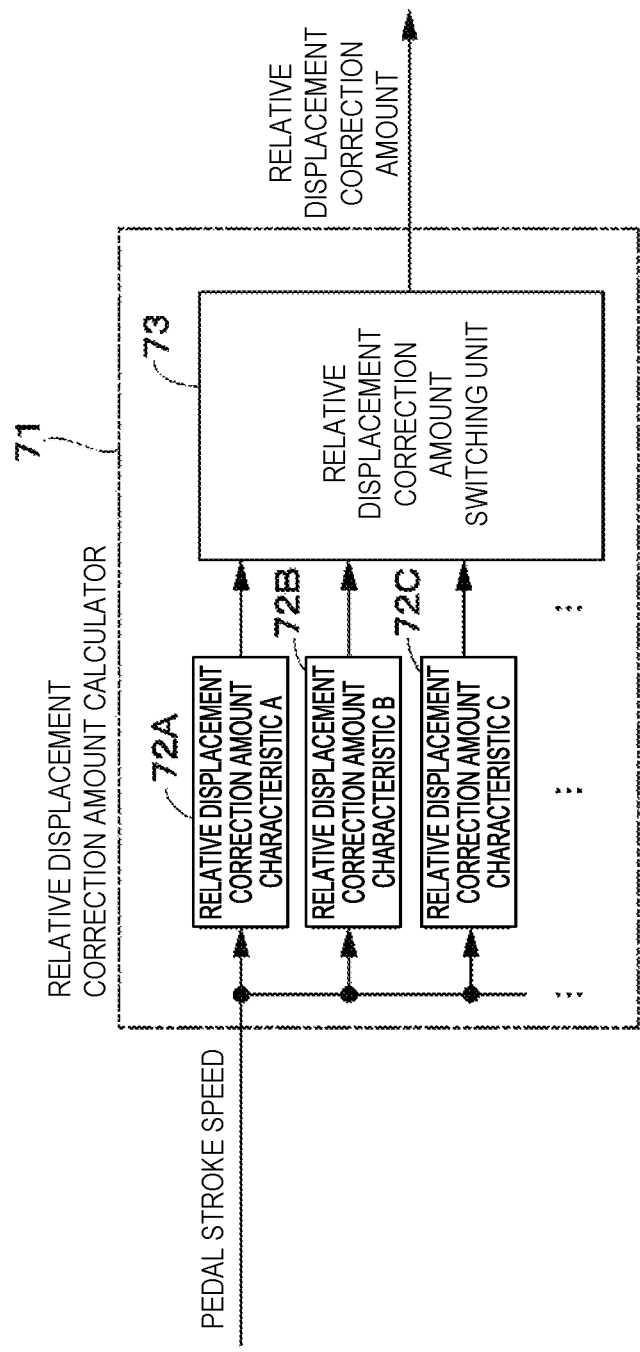
FIG. 19 is a control block diagram illustrating a relative displacement correction amount calculator according to a second modification.

In the first embodiment, the master pressure control unit 52 (the reaction force generation portion thereof) has been described referring to the example in which it is configured to include the relative displacement correction amount calculator 55 having one characteristic (the characteristic illustrated in FIG. 9). However, the master pressure control unit 52 is not limited thereto, and a relative displacement correction amount calculator 71 may be configured to include a plurality of relative displacement correction amount characteristic portions 72A, 72B, and 72C, and a relative displacement correction amount switching portion 73 that switches these characteristics, like a second modification illustrated in FIG. 19. In this case, the pressing force characteristic can be changed according to the running scene and/or the driver's operation by selecting (switching) which characteristic should be employed according to the running scene and/or the driver's operation by the relative displacement correction amount switching portion 73. The same also applies to the second and third embodiments and the first modification.

In the first embodiment, the electric booster 30 has been described referring to the example in which the rotational motor is employed as the electric motor 38 forming the electric actuator 37. However, the electric booster 30 is not limited thereto, and may employ, for example, a linearly movable motor (a linear motor) as the electric motor. In other words, various kinds of electric actuators can be employed as the electric actuator (the electric motor) that thrusts the assist member (the power piston or the linear motion member). The same also applies to the second and third embodiments and the first and second modifications. Further, each of the embodiments and each of the modifications are only an example, and it is apparent that the configurations indicated in the different embodiments and modifications can be partially replaced or combined.

Possible configurations as the electric booster based on the above-described embodiments include the following examples.

(1) According to a first configuration, an electric booster includes an input member advanceable and retractable according to an operation on a brake pedal, an assist member disposed movably relative to this input member, an electric actuator configured to advanceably/retractably move this assist member, and a control portion configured to set a target movement amount of the assist member according to an amount of a movement of the input member that is caused by the brake pedal, and control the electric actuator to move the assist member so as to achieve the target movement amount, thereby causing a brake hydraulic pressure to be generated in a master cylinder. The control portion includes a reaction force generation portion configured to change a characteristic of a hydraulic reaction force applied to the brake pedal. The reaction force generation portion corrects the target movement amount according to a temporal change in the movement amount of the input member.

According to this first configuration, the electric booster can change the characteristic of the hydraulic reaction force applied to the brake pedal by correcting the target movement amount according to the temporal change in the movement amount of the input member (i.e., a pedal operation speed) by the reaction force generation portion. As a result, the electric booster can realize an arbitrarily pedal feeling according to the pedal operation speed. In addition, the electric booster can change the pedal feeling without requiring a change in the hardware configuration, thereby allowing the components to be used in common and thus being able to improve production efficiency and also reduce manufacturing cost. Further, for example, in a case where the electric booster is equipped with a function of switching the correction value, the electric booster can variably adjust the pedal feeling according to a running scene.

(2) According to a second configuration, in the electric booster according to the first configuration, the reaction force generation portion corrects the target movement amount of the assist member in such a manner that this target movement amount reduces as the temporal change in the movement amount of the input member increases.

According to this second configuration, when the brake pedal is operated quickly, the electric booster requires a greater pressing force to acquire a predetermined deceleration (braking force), thereby being able to realize a characteristic that facilitates an adjustment of the deceleration. Therefore, the electric booster can prevent the braking force from exceeding a braking force intended by a driver. More specifically, if the pressing force to acquire the predetermined deceleration reduces when the brake pedal is operated quickly, the brake pedal might be advanced more than the driver's intention, thereby leading to a greater braking force. On the other hand, reducing the target movement amount of the assist member as the speed of the input member increases leads to the necessity of a greater pressing force when the brake pedal is operated quickly. As a result, the brake booster can prevent the braking force from reaching or exceeding the braking force desired by the driver. On the other hand, when the brake pedal is operated slowly (operated unhurriedly), the electric booster requires a lower pressing force to acquire the predetermined deceleration, thereby being able to raise the deceleration quickly when the brake pedal is pressed unhurriedly.

(3) According to a third configuration, in the electric booster according to the first configuration, the reaction force generation portion corrects the target movement amount of the assist member in such a manner that this target movement amount increases as the temporal change in the movement amount of the input member increases.

According to this third configuration, when the brake pedal is operated quickly, the electric booster requires a lower pressing force to acquire the predetermined deceleration, thereby being able to raise the deceleration quickly when the brake pedal is pressed fast. On the other hand, when the brake pedal is operated slowly (operated unhurriedly), the electric booster requires a greater pressing force to acquire the predetermined deceleration, thereby being able to improve operability when the brake pedal is pressed unhurriedly.

(4) According to a fourth configuration, in the electric booster according to any of the first to third configurations, the reaction force generation portion changes a reaction force characteristic of a reaction force mechanism configured to receive a hydraulic reaction force from the master cylinder side. According to this fourth configuration, the brake booster can change the pedal feeling by changing the reaction force characteristic of the reaction force mechanism.

(5) According to a fifth configuration, in the electric booster according to the fourth configuration, the reaction force generation portion changes the reaction force characteristic by changing a relative displacement amount of the assist member relative to the input member. According to this fifth configuration, the brake booster can change the reaction force characteristic of the reaction force mechanism by changing the relative displacement amount of the assist member relative to the input member.

The present invention is not limited to the above-described embodiments, and includes various modifications. For example, the above-described embodiments have been described in detail to facilitate better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2017-185039 filed on Sep. 26, 2017. The entire disclosure of Japanese Patent Application No. 2017-185039 filed on Sep. 26, 2017 including the specification, the claims, the drawings, and the abstract is incorporated herein by reference in its entirety.

REFERENCE SIGN LIST 6 brake pedal
7 displacement sensor (brake operation sensor, input member movement amount detection device, operation amount detection device)
21 master cylinder
30 electric booster
33 input member (reaction force mechanism)
37 electric actuator
38 electric motor
40 rotational angle detection sensor (assist member movement amount detection device)
48 power piston (assist member, reaction force mechanism)
50 reaction disk (reaction force mechanism)
52 master pressure control unit (control portion, reaction force generation portion)
53 reference relative displacement calculator (reaction force generation portion)
55 relative displacement correction amount calculator (reaction force generation portion)
56 addition portion (reaction force generation portion)

The invention claimed is:

1. An electric booster comprising:
an input member advanceable and retractable according to an operation on a brake pedal;
an assist member disposed movably relative to the input member;
an electric actuator configured to advanceably/retractably move the assist member; and
a control portion configured to set a target movement amount of the assist member according to an amount of a movement of the input member that is caused by the brake pedal, and control the electric actuator to move the assist member so as to achieve the target movement amount, thereby causing a brake hydraulic pressure to be generated in a master cylinder,
wherein the control portion includes a reaction force generation portion configured to change a characteristic of a hydraulic reaction force applied to the brake pedal, and
wherein the reaction force generation portion corrects the target movement amount of the assist member in such a manner that the target movement amount increases as a temporal change in the movement amount of the input member increases.

2. The electric booster according to claim 1, wherein the reaction force generation portion changes a reaction force characteristic of a reaction force mechanism configured to receive a hydraulic reaction force from the master cylinder side.

3. The electric booster according to claim 2, wherein the reaction force generation portion changes the reaction force characteristic by changing a relative displacement amount of the assist member relative to the input member.

* * * * *